(12) United States Patent
Brown et al.

(10) Patent No.: US 11,744,396 B1
(45) Date of Patent: *Sep. 5, 2023

(54) SYSTEM, METHOD, AND DEVICE FOR AGITATING COFFEE GROUNDS

(71) Applicant: Caffeine Innovations, LLC, Chandler, AZ (US)

(72) Inventors: Matthew S. Brown, Gilbert, AZ (US); Samuel T. Fulton, Telluride, CO (US); Thomas G Pittman, Gilbert, AZ (US); Carl TenBrink, Huntington Beach, CA (US)

(73) Assignee: Caffeine Innovations, LLC, Chandler, AZ (US)

( * ) Notice: Subject to any disclaimer, the term of this patent is extended or adjusted under 35 U.S.C. 154(b) by 575 days.

This patent is subject to a terminal disclaimer.

(21) Appl. No.: 16/851,091

(22) Filed: Apr. 16, 2020

Related U.S. Application Data

(63) Continuation-in-part of application No. 15/348,805, filed on Nov. 10, 2016, now Pat. No. 10,653,266.
(Continued)

(51) Int. Cl.
*A47J 31/06* (2006.01)
*A23F 5/26* (2006.01)
(Continued)

(52) U.S. Cl.
CPC ............ *A47J 31/0631* (2013.01); *A23F 5/26* (2013.01); *A47J 31/5253* (2018.08); *A47J 43/0711* (2013.01)

(58) Field of Classification Search
CPC .................................................. A47J 31/0631
See application file for complete search history.

(56) References Cited

U.S. PATENT DOCUMENTS 3,985,069 A 10/1976 Cavalluzzi
6,079,314 A 6/2000 Mackinnon
(Continued)

FOREIGN PATENT DOCUMENTS

CN 2579301 Y 10/2003
CN 201088389 Y 7/2008
(Continued)

OTHER PUBLICATIONS http://www.target.com/p/icoffee-steambrew-12-cup-automatic-coffee-maker/-/A-17051318?ref=tgt_adv_XSG10001&AFID=google_pla_df&LNM=17051318&CPNG=Appliances&kpid=17051318&LID=3pgs&ci_src=17588969&ci_sku=17051318&kpid=17051318&gclid= CMDXju3OkscCFZFgfgodzLQOfA.
http://myeurostores.com/coffee-maxx-2go-thermo-star-coffee-machine-with-stirring-heated-mug-genuine-new.html.

*Primary Examiner* — John J Norton
(74) *Attorney, Agent, or Firm* — BOOTH UDALL FULLER, PLC

(57) ABSTRACT

A system, method, and device for coffee grounds agitation is disclosed. The coffee grounds agitation device includes an agitating assembly extending into at least one brewing basket having a mesh. The agitating assembly includes a driver, and at least one agitator operatively coupled to the driver such that the driver impels the at least one agitator to move within the at least one brewing basket. The agitating assembly also includes a control circuit in electrical communication with the driver and configured to impel the at least one agitator with the driver. The agitating assembly is movable into, and out of, a brewing configuration. The brewing configuration includes the at least one agitator being substantially contained within the at least one brewing basket while also operatively engaged with the driver.

23 Claims, 19 Drawing Sheets

Related U.S. Application Data

(60) Provisional application No. 62/253,351, filed on Nov. 10, 2015.

(51) Int. Cl.
*A47J 43/07* (2006.01)
*A47J 31/52* (2006.01)

(56) References Cited

U.S. PATENT DOCUMENTS

| | | |
|---|---|---|
| 6,079,315 A | 6/2000 | Beaulieu |
| 6,817,279 B2 | 11/2004 | Leung et al. |
| 8,146,487 B2 | 4/2012 | Nikolaas et al. |
| 10,653,266 B1 * | 5/2020 | Brown ................ A47J 43/0711 |
| 2008/0050491 A1 | 2/2008 | Ramus |
| 2008/0148956 A1 | 6/2008 | Maurer |
| 2009/0145302 A1 | 6/2009 | Dutertre et al. |
| 2009/0178569 A1 | 7/2009 | Tucker |
| 2011/0248108 A1 | 10/2011 | Carriere |
| 2012/0002501 A1 | 1/2012 | Ulstad |
| 2012/0121764 A1 | 5/2012 | Lai et al. |
| 2013/0248627 A1 | 9/2013 | Huang |
| 2014/0165845 A1 | 6/2014 | Issar |
| 2014/0242239 A1 * | 8/2014 | Boggavarapu ...... A47J 31/4492 426/433 |
| 2015/0359380 A1 | 12/2015 | Oleksy |
| 2016/0229830 A1 * | 8/2016 | Wang .................. C07D 209/04 |
| 2016/0302609 A1 * | 10/2016 | Sakane .................. A47J 31/40 |

FOREIGN PATENT DOCUMENTS

| | | |
|---|---|---|
| CN | 203564110 | 4/2014 |
| JP | H0880255 A | 3/1996 |
| JP | 2003109107 | 4/2003 |
| JP | 5372459 B2 | 12/2013 |
| KR | 2020110002883 U | 3/2011 |

* cited by examiner

SYSTEM, METHOD, AND DEVICE FOR AGITATING COFFEE GROUNDS

RELATED APPLICATIONS

This application is a continuation-in-part of, and claims the benefit of, U.S. patent application Ser. No. 15/348,805, filed Nov. 10, 2016, titled "Coffee Grounds Stirring Device" which claims the benefit of U.S. Provisional Application No. 62/253,351, filed Nov. 10, 2015 titled "Coffee Grinds Stirring Assembly". The entirety of the above referenced disclosures are hereby incorporated herein by this reference.

TECHNICAL FIELD

Aspects of this document relate generally to brewing coffee, specifically while agitating the coffee grounds.

BACKGROUND

Conventional coffee machines utilize a coffee basket to hold coffee grounds as water passes through them during the coffee brewing process. As the water passes through the coffee grounds, it picks up some of the oils, flavors, and solids from the coffee grounds before dripping into a coffee pot or other vessel. However, in conventional coffee machines, coffee grounds typically remain in the same position throughout the brewing process. Some grounds are exposed to more water than others, resulting in reduced brewing efficiency as well as lower overall quality.

Previous efforts to agitate coffee grounds during brewing resulted in large coffee makers specially designed to battle this inefficiency. However, these previous attempts would require the purchase of an entirely different coffee machine, and most coffee drinkers already have a consumer-level coffee maker. The potential increase in efficiency and quality due to stirring the coffee grounds while brewing may not warrant such a replacement, especially at the non-commercial level. Furthermore, coffee makers have a wide array of features available; it is unlikely that one or two coffee machines able to agitate coffee grounds could satisfy the demands of most coffee drinkers, each of whom likely already owns a coffee maker that meets their particular needs.

SUMMARY

According to one aspect, a coffee grounds agitation device includes an agitating assembly extending into at least one brewing basket having a mesh, the agitating assembly including a driver and at least one agitator operatively coupled to the driver such that the driver impels the at least one agitator to move within the at least one brewing basket. The device also includes a control circuit in electrical communication with the driver and configured to impel the at least one agitator with the driver. The agitating assembly is movable into, and out of, a brewing configuration that includes the at least one agitator being substantially contained within the at least one brewing basket while also operatively engaged with the driver.

Particular embodiments may comprise one or more of the following features. Each of the at least one agitator may be a blade, the driver may be a motor, and/or the motor may impel the at least one blade to rotate within the at least one brewing basket. Each of the at least one agitator may be a probe, the driver may be a motor, and/or the motor may impel the at least one probe to vibrate within the at least one brewing basket. The agitating assembly further may further include a water inlet in fluid communication with a water outlet. The water outlet may be positioned to release water introduced through the water inlet into the at least one brewing basket while the agitating assembly is in the brewing configuration. The driver may impel the at least one agitator to rotate within the at least one brewing basket, and the water outlet may be coupled to the at least one agitator such that the water outlet and the at least one agitator rotate together with respect to the at least one brewing basket while the at least one agitator is impelled to rotate by the driver. The at least one brewing basket may include a first brewing basket, and/or the agitating assembly may be releasably coupled to the first brewing basket proximate a basket rim of the first brewing basket. The at least one brewing basket may further include a coffee basket of a coffee maker, and/or the coffee grounds agitation device may be sized to fit inside the coffee basket while the coffee basket is engaged with the coffee maker. The at least one agitator may be an additional brewing basket, the driver may be a motor, and/or the motor may impel the additional brewing basket to rotate within the at least one brewing basket. The driver may be in electrical communication with, and powered by, a coffee maker including one of the at least one brewing basket. The at least one agitator may be releasably coupled to the driver and/or movably coupled to one of the at least one brewing basket. The device may further include at least one sensor in electrical communication with the control circuit. The at least one sensor may include one of a conduction sensor, a temperature sensor, and a mechanical switch and may be configured to detect a liquid being introduced to the at least one brewing basket by sensing a change in one of conduction, temperature, and force. The control circuit may be configured to impel the at least one agitator with the driver in response to one of the at least one sensor detecting the introduction of liquid to the at least one brewing basket. The at least one sensor may include a refractometer positioned with respect to one of the at least one brewing basket to measure a total dissolved solids of a liquid leaving the at least one brewing basket.

According to another aspect of the disclosure, a coffee grounds agitation system includes a coffee maker and an agitating assembly coupled to the coffee maker and extending into at least one brewing basket having a mesh. The agitating assembly includes a driver and at least one agitator operatively coupled to the driver such that the driver impels the at least one agitator to move within the at least one brewing basket. The system also includes a control circuit in electrical communication with the driver and the coffee maker, the control circuit powered by the coffee maker and configured to impel the at least one agitator with the driver. The agitating assembly is movable into, and out of, a brewing configuration that includes the at least one agitator being substantially contained within the at least one brewing basket while also operatively engaged with the driver.

Particular embodiments may comprise one or more of the following features. The system may further include a water outlet in fluid communication with the coffee maker. The water outlet may be positioned to release water received from the coffee maker into the at least one brewing basket while the agitating assembly is in the brewing configuration. The driver may impel the at least one agitator to rotate within the at least one brewing basket. The water outlet may be coupled to the at least one agitator such that the water outlet and the at least one agitator rotate together with respect to the at least one brewing basket while the at least one agitator is impelled to rotate by the driver. The system may further include a heating element encircling, and in thermal contact with, the at least one brewing basket, the heating element in electrical communication with the control circuit and the coffee maker. The at least one agitator may be releasably coupled to the driver and/or movably coupled to one of the at least one brewing basket.

According to yet another aspect of the disclosure, a method for agitating coffee grounds includes adding the coffee grounds to a first brewing basket having a mesh, then moving an agitating assembly having at least one agitator into a brewing configuration by inserting the at least one agitator into the coffee grounds until the at least one agitator is substantially contained within the first brewing basket while also being operatively coupled to a driver of the agitating assembly. The agitating assembly further includes a control circuit in electrical communication with the driver and configured to impel the at least one agitator with the driver to move within the first brewing basket. The method also includes agitating the coffee grounds with the at least one agitator by activating the driver with the control circuit while the agitating assembly and first brewing basket are inside a coffee maker and while water received from the coffee maker is introduced to the coffee grounds within the first brewing basket.

Particular embodiments may comprise one or more of the following features. Each of the at least one agitator may be a blade, the driver may be a motor, and agitating the coffee grounds may include activating the motor to drive the at least one blade to rotate within the at least one brewing basket. The method may further include placing a coffee grounds agitation device including the agitating assembly and the first brewing basket and containing the coffee grounds into a second brewing basket. The method may also include placing the second brewing basket containing the coffee grounds agitation device into the coffee maker. The coffee grounds agitation device may be sized to fit inside the second brewing basket while the second brewing basket is in use by the coffee maker. The second brewing basket may have a largest width less than five inches. The control circuit may be in electrical communication with a sensor including one of a conduction sensor, a temperature sensor, and a mechanical switch. The sensor may be configured to detect liquid being introduced to the first brewing basket by sensing a change in one of conduction, temperature, and force. The driver may be activated by the control circuit in response to the sensor detecting the introduction of water to the first brewing basket by the coffee maker.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
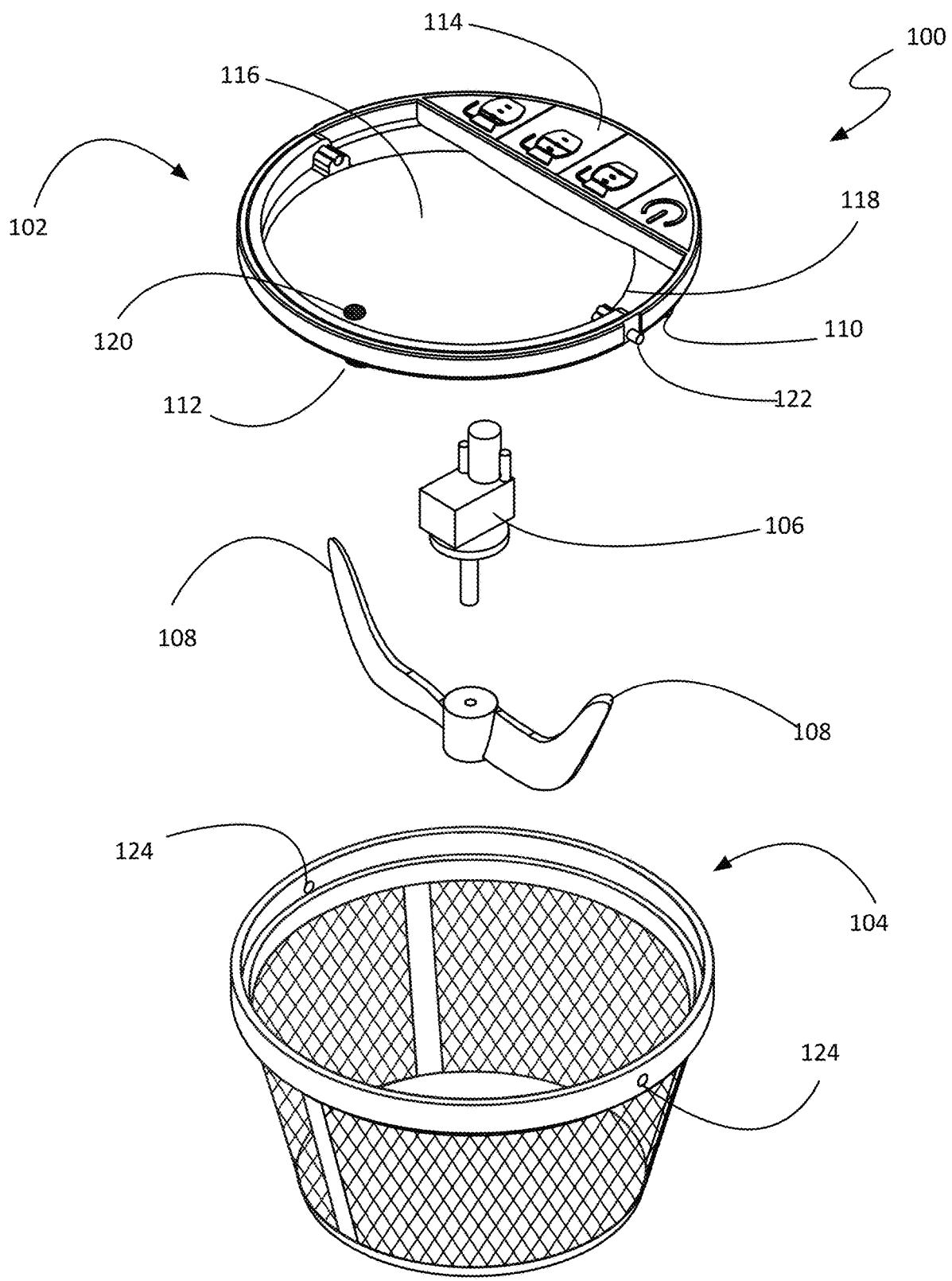
FIG. 1 is an exploded view of a coffee grounds stirring device.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

FIGS. 1 through 8 depict non-limiting embodiments of a coffee grounds stirring device 100 having a stirring assembly 102; some embodiments depicted also comprise a stirring basket 104. As shown, the stirring assembly 102 includes a motor 106, two blades 108 operatively coupled to the motor 106, and a sensor 112. Coffee grounds are placed inside a stirring basket 104 or a compatible vessel, and the coffee grounds stirring assembly 102 is coupled to the top. The coffee grounds stirring device 100 is then placed in the coffee basket of a conventional coffee maker. The motor 106 drives the blades 108 to rotate in response to the sensor 112 detecting that the brewing process has begun. As the blades 108 rotate, the coffee grounds are stirred and mixed as hot water passes through them. By stirring the coffee grounds during the brewing process, they are more evenly distributed and more thoroughly exposed to the hot water, increasing the quality of the coffee and the efficiency of the brewing process.

Figure 8:
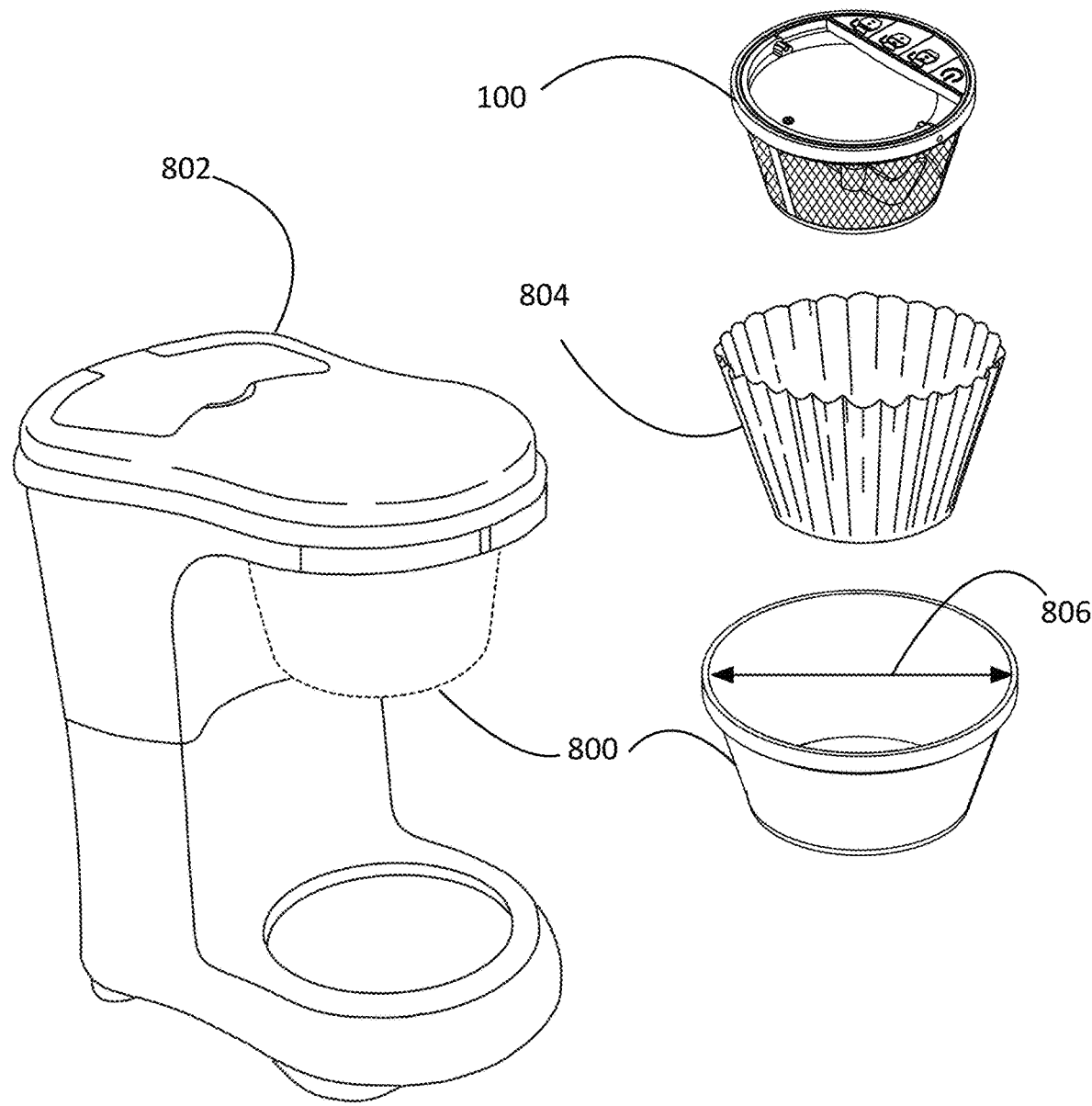
FIG. 8 is an exploded view of an exemplary use environment for a coffee grounds stirring device.

As shall be discussed in greater detail with respect to FIG. 8, the coffee grounds stirring device 100 is sized to be used in conjunction with a conventional coffee machine. See, for example, coffee machine 802 of FIG. 8. By making the coffee grounds stirring device 100 small enough to fit inside the coffee basket of a conventional coffee machine while relying on a sensor 112 to determine when to begin stirring, this device 100 may be employed in most consumer-level coffee makers without any modification to the coffee maker. Using a coffee grounds stirring device, coffee drinkers may enjoy the benefits of stirring the grounds during brewing without having to replace or modify their coffee maker, or deviate from preferred, pre-existing coffee making procedures.

In the context of the present disclosure and the claims that follow, a coffee basket refers to any vessel used to hold coffee grounds within a coffee maker during the brewing process (e.g. as hot water is passed through the grounds, etc.). The coffee basket may comprise any coffee basket known in the art. Coffee baskets are often used in conjunction with some sort of filter. Such use, as well as the dimensions of a coffee basket, are discussed in greater detail with respect to FIG. 8.

Furthermore, reference is made throughout this disclosure to a coffee maker. In the context of the present description and the claims that follow, a coffee maker may comprise any coffee machine known in the art. The coffee maker 802 shown in FIG. 8 is provided for example only, and is not meant as a limitation. Although the benefits of a coffee grind stirring device 100 will be of interest to owners of consumer-level coffee makers, it should also be recognized that the contemplated device may be used in conjunction with many commercial-level coffee makers known in the art, without departing from the scope of this disclosure.

Figure 2:
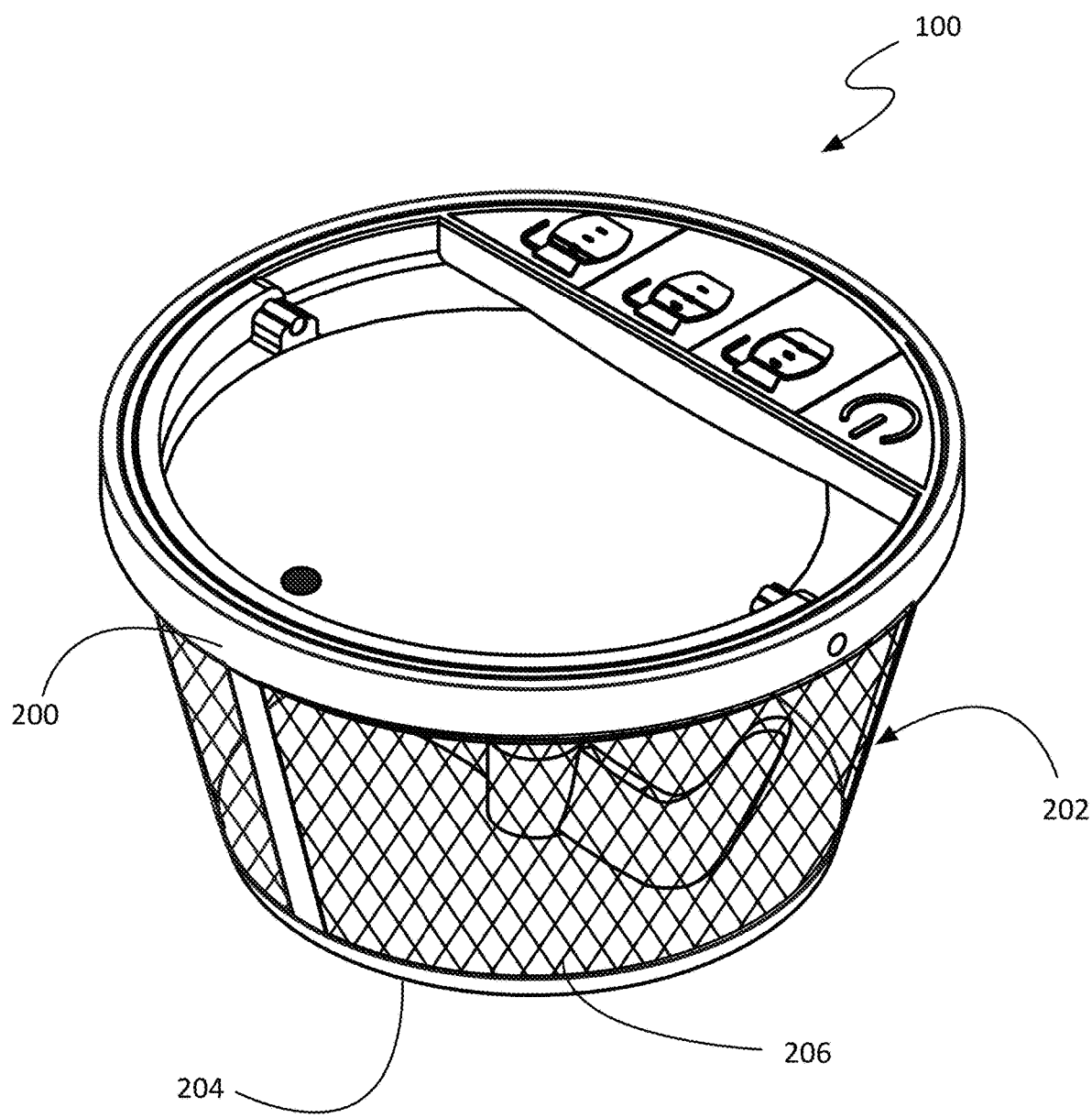
FIG. 2 is a perspective view of a coffee grounds stirring device.

FIGS. 1 and 2 depict exploded and perspective views of a non-limiting example of a coffee grounds stirring device 100, respectively. Specifically, FIGS. 1 and 2 show embodiments of a stirring device 100 having a stirring assembly 102 and a stirring basket 104. Some embodiments of the coffee grounds stirring device 100 include a stirring basket 104, while other embodiments of the device 100 are adapted for use with pre-existing vessels, such as a reusable coffee filter. The type of filter used during the brewing process can have an effect on the flavor and mouthfeel of the resulting coffee. Paper filters generally result in more clarified coffee, and also soak up some of the oils released during brewing. Reusable filters, such as metal filters, often allow more solids through, resulting in a stronger coffee with a noticeably different texture. Embodiments of the device 100 adapted for use with pre-existing vessels may allow users to incorporate the ground stirring process into their brewing without changing their method of filtration.

As shown in FIGS. 1 and 2, the stirring basket 104 comprises a basket rim 200, a side wall 202, and a basket floor 204. As shown, the stirring basket 104 is at least partially made of a mesh 206. FIGS. 1 and 2 depict a stirring basket 104 with mesh 206 only in the side wall 202. In other embodiments, the basket floor 204 may also comprise mesh 206, or the basket floor 204 may comprise mesh 206 instead of the side wall 202.

The hole size of the mesh 206 used in a stirring basket 104 may vary, depending upon the intended use for the device 100. For example, in some embodiments, where the coffee grounds stirring device 100 is intended for use inside a traditional paper filter, the mesh 206 may be wide, serving to prevent the paper filter from being pulled into a blade 108 and torn during the stirring process. In other embodiments, the stirring basket 104 may also serve as a reusable coffee filter, with a mesh 206 fine enough to filter the coffee. Those skilled in the art will recognize that a wide range of mesh hole sizes are compatible with the contemplated device, depending upon the type and context of filtration desired.

According to various embodiments, a stirring basket 104 may be constructed of a variety of materials, including plastic and metal, able to withstand the temperatures associated with brewing coffee and support the weight of the stirring assembly 102. In some embodiments, the stirring basket 104 may be composed of materials that will not easily be altered by exposure to hot coffee and coffee grounds (e.g. staining, flavor retention, odor retention, etc.). The housing 110 may also be constructed out of such materials.

As shown in FIG. 2, the stirring assembly 102 is contained within the stirring basket 104. For effective use within a conventional coffee maker, a coffee grounds stirring device 100 must balance the need for a profile low enough for use in a conventional coffee machine without collision (e.g. not being able to close a hatch or insert a coffee basket due to the size of the device 100), the need for space for the coffee grounds, and the need for unobstructed flow through the mesh 206. By placing the stirring assembly 102 inside the stirring basket 104, the size of the stirring basket 104 may be maximized without sacrificing usable volume or mesh surface area. In some embodiments, the bulk of the stirring assembly 102 may be contained entirely within the width of the basket rim 200 of the stirring basket 104. As a specific example, in one embodiment, the housing 110 and funnel 116 may be less than one inch thick.

According to various embodiments, the stirring assembly 102 may be releasably coupled to the stirring basket 104. In some embodiments the stirring assembly 102 is releasably coupled to the basket rim 200. It is advantageous to be able to separate the assembly 102 from the basket 104, for loading new coffee grounds as well as cleaning the device. The coupling between the assembly 102 and the basket 104 may be made releasable in a number of ways. As shown in the non-limiting embodiment depicted in FIG. 2, the stirring assembly 102 comprises two mounting pegs 122, aligned with two holes 124 in the basket rim 200. In some embodiments, the mounting pegs 122 may be spring-loaded or otherwise biased and extend into the interior of the basket rim 200 such that a user may press them to extend into the holes 124, coupling with the basket 104, and then press them again to cause them to retract, releasing the basket 104, similar to the mechanism of a retractable ball point pen.

Figure 3:
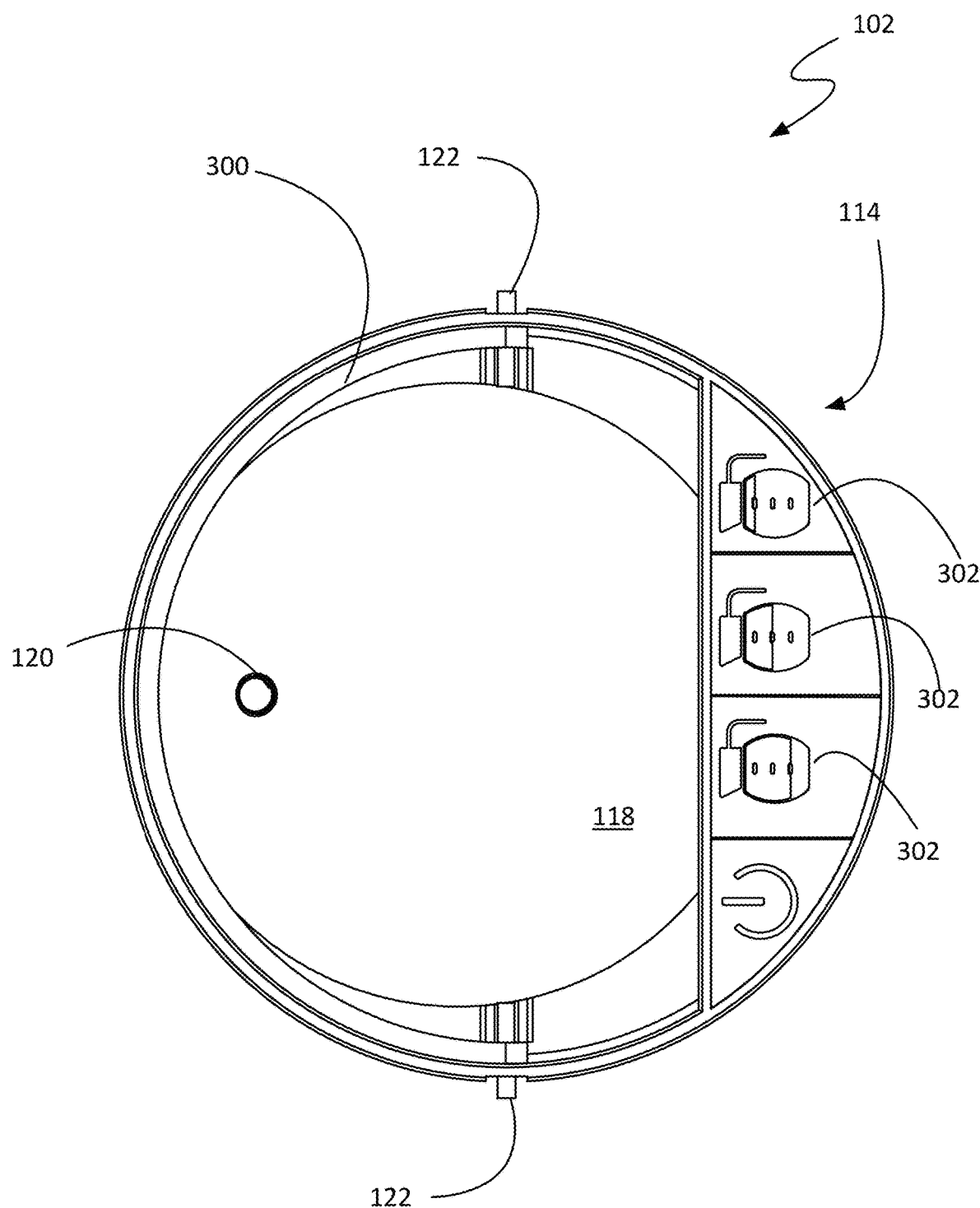
FIG. 3 is a top view of a stirring assembly of a coffee grounds stirring device.

In other embodiments, the mounting pegs 122 may be part of a flexible handle, such as handle 300 shown in FIG. 3. In such embodiments, a user may squeeze the handle to pull the pegs 122 out of their holes 124, decoupling the assembly 102 from the basket 104. In still other embodiments, a stirring assembly 102 may be releasably coupled to a stirring basket 104 using magnets. Furthermore, in some embodiments, including embodiments where a stirring assembly is adapted for use with pre-existing vessels, the coupling may be accomplished with an expanding rubber gasket around the perimeter of the stirring assembly 102. When the gasket is rotated with respect to the stirring assembly 102, it expands or contracts, creating or releasing a seal with a stirring basket 104 or other vessel.

As shown in FIGS. 1 and 2, the stirring assembly 102 includes a funnel 116, the funnel 116 having a large opening 118 and a small opening 120. Some embodiments, including those depicted in FIGS. 1 and 2, are intended to be compatible with a variety of conventional coffee makers. While most coffee makers operate on similar principles of adding hot water to coffee grounds, they execute these principles in different ways. For example, one coffee maker may introduce hot water to the coffee basket near the edge while another may pour directly into the center. The funnel 116 allows the liquid to be introduced to the device 100 in a variety of locations within the large opening 118, all leading to the small opening 120. Many coffee makers make an effort to spread the water over the all the grounds; since the grounds will be stirred during the brewing process, the introduction of the liquid to the grounds through a single point (e.g. the small opening 120 of the funnel 116) is not disadvantageous.

In other embodiments, a partially inverted funnel may be employed, where instead of a small opening, the liquid is gathered in a crescent shaped valley with a curved clot at the bottom. Such a funnel would peak near the middle, rather than be at a minimum. This may be advantageous, as it may provide space for other elements of the stirring assembly 102, such as a housing 110 and/or a motor 106, close to the central axis of the device, while still collecting fluid.

Other embodiments may not include a funnel 116. For example, in some embodiments, the stirring assembly 102 may be minimized with respect to the area used with the basket rim 200, leaving much of the stirring basket 104 and its contents exposed. While this approach may require an adjustment of the coffee grounds stirring device 100 within the coffee basket to prevent watering the top of the assembly (possibly splashing and causing a mess), the exposed stirring basket 104 may facilitate the addition of coffee grounds to the device 100.

As shown in FIGS. 1 through 3, the stirring assembly 102 includes a plurality of buttons 114. As depicted, these are mechanisms that are able to receive and pass along user input. It should be clear to those skilled in the art that these may be substituted with other input devices, including but not limited to switches, knobs, levers, touch screens, and the like, without departing from the scope and spirit of the disclosure. In some embodiments, the plurality of buttons 114 may be covered with a flexible, watertight membrane, to protect against the introduction of liquid during the brewing process. The plurality of buttons may be employed to receive various forms of input from a user, including toggling the device 100 between an "off" state in which no power is being used, and a "standby" state, in which a sensor 112 is able to determine if the brewing process has begun.

The plurality of buttons 114 may also be employed to select a period of time for which the motor 106 will be driven. See, for example, FIG. 3, where three of the buttons 114 are labeled with coffee pots filled to different levels. Each of those buttons 114 corresponds with a pre-determined period of time 300 to stir the depicted amount of coffee to be brewed. In other embodiments, the time may be indicated in minutes. As an option, the selected period of time may be indicated with an LED next to the selected button 114. In still other embodiments, the time may be specified through a more granular interface, such as a knob or dial. A period of time may be chosen or defined using any methods of input known in the art.

Figure 4:
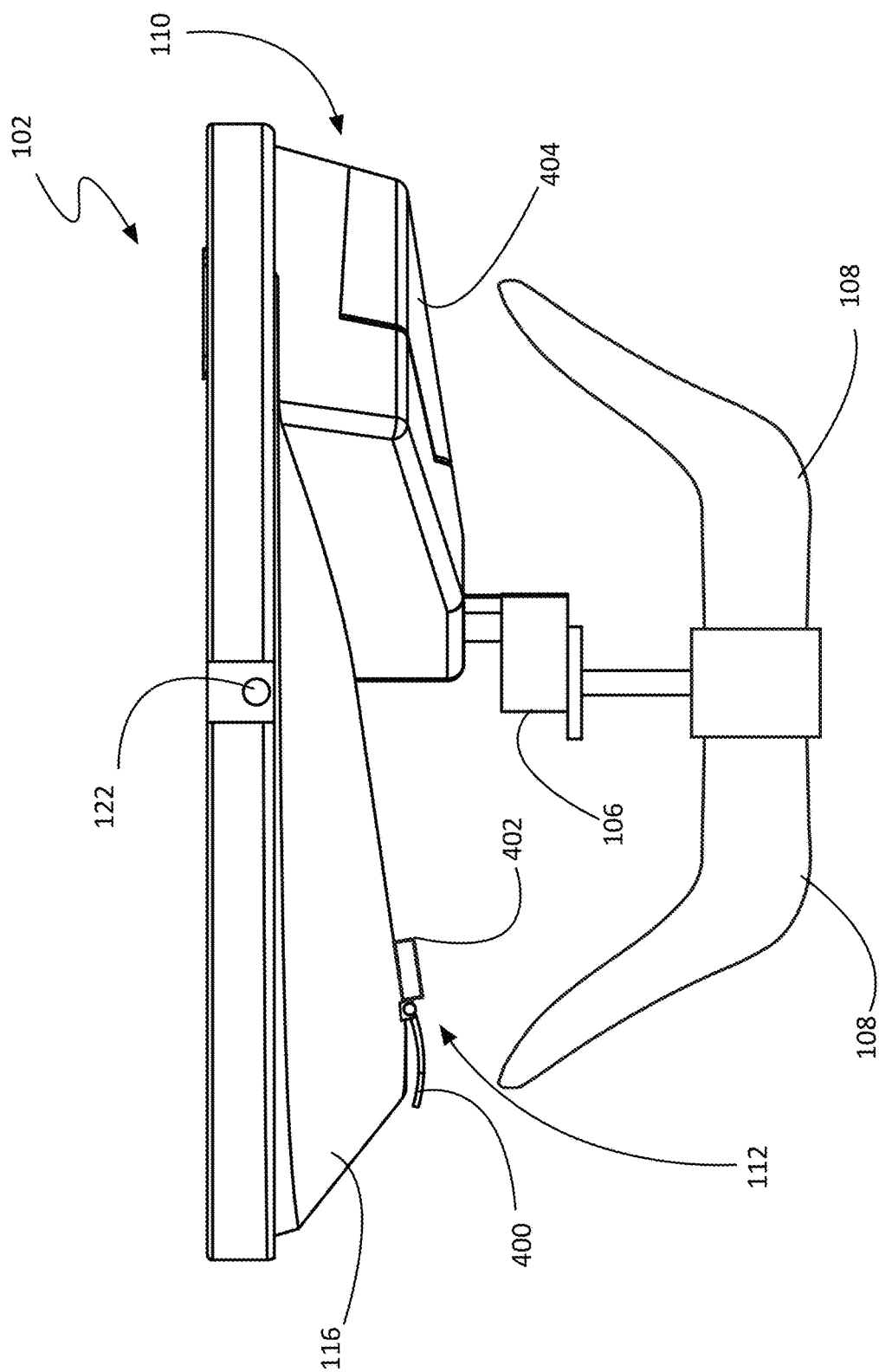
FIG. 4 is a side view of a stirring assembly of a coffee grounds stirring device.
Figure 5:
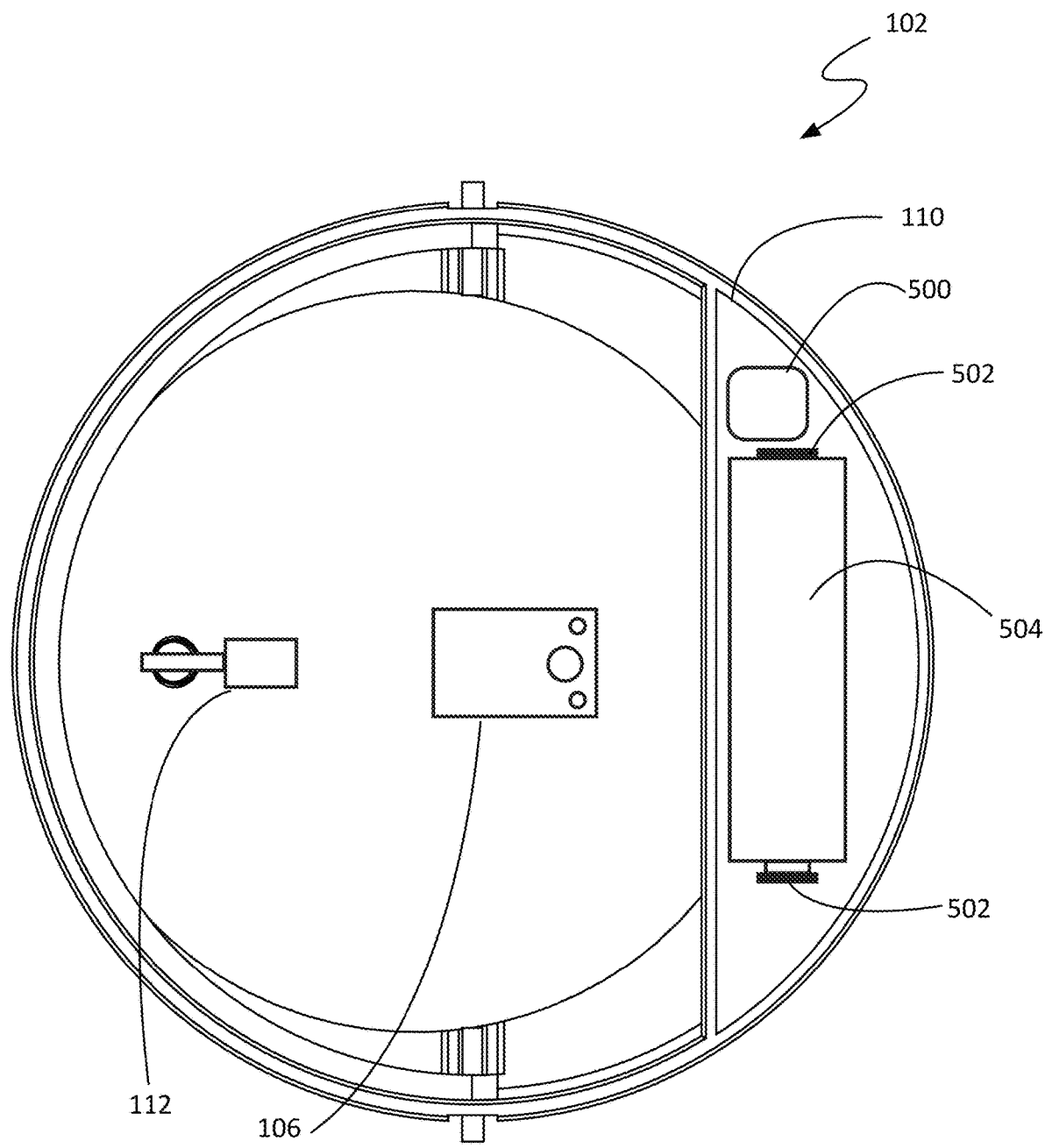
FIG. 5 is a top view of a stirring assembly of a coffee grounds stirring device, with transparency.

FIGS. 3 through 5 show a stirring assembly 102, according to various embodiments. FIG. 3 shows a top view of a stirring assembly 102, while FIG. 5 shows the same top view, but with the upper layer of the assembly 102 (including the funnel 116) made transparent, such that the interior of the housing 110 and the bottom of the funnel 116 is visible. FIG. 4 shows a side view of the stirring assembly 102.

As shown, the assembly 102 includes a handle 300 that is movably coupled to the rest of the stirring assembly 102, such that it can fold down flush with the assembly 102 when not in use. The handle 300 is advantageous in inserting and removing the device 100 from a coffee basket 800, and may also play a role in the releasable nature of the coupling between the stirring assembly 102 and a stirring basket 104, as previously discussed. Some embodiments may have a handle 300, such as a lip, incorporated into the housing 110 or other part of the assembly 102 such that the device may be lifted by a low-profile handle without any moving parts that may wear out or break.

FIG. 4 shows a side view of a non-limiting example of a stirring assembly 102 having a sensor 112 comprising a lever 400 and a reed switch 402. The lever 400 is positioned beneath the small opening 120 of the funnel 116, such that when a liquid enters the funnel 116 and passes through the small opening 120, it will hit the lever 400 and trigger the reed switch 402. In other embodiments, the reed switch 402 may be replaced with other mechanical switches of the like.

Some embodiments of the coffee grounds stirring device 100 may employ mechanical switches to determine if stirring is needed or not, such as the reed switch 402 shown in FIG. 4. Other embodiments may employ other types of sensors. For example, in one embodiment, the sensor 112 may comprise one or more pairs of conductors disposed around the small opening 120 of the funnel 116, or around other locations where the presence of liquid during the brewing process is predictable. The liquid completes the circuit between two conductors; the completed circuit indicates the initiation of the brew process.

In another embodiment, a sensor 112 may determine the temperature of some object or surface within the coffee grounds stirring device 100, such as the funnel 116. A sharp rise in temperature may indicate the start of the brewing process. In yet another embodiment, the sensor 112 may comprise a motion detector, which may detect the introduction of water to the interior of the stirring basket 104. Advantageously, a single motion detector may monitor the entire interior of the basket 104, making it compatible with stirring assemblies that do not include a funnel.

In some embodiments, a single sensor 112 may be used. In other embodiments, multiple sensors 112 may be positioned throughout the coffee grounds stirring device 100. The sensor 112 may determine whether or not the brew process is happening using a variety of input, including, but not limited to, light, conduction, sound, pressure, and the like.

As shown in FIG. 4, the stirring assembly 102 includes a battery compartment 404 in the housing 110. According to various embodiments, the coffee grounds stirring device 100 may be battery powered, allowing it to be used with most conventional coffee makers without modification or adjustment (e.g. a power wire hanging out of a brewing chamber, etc.). In some embodiments, a rechargeable battery may power the device 100. As a specific example, the device 100 may have a rechargeable battery completely sealed inside the housing, and which can be charged through induction. By not having a battery compartment 404 that opens, the assembly 102 is more watertight. As an option, the assembly 102 may be charged when placed on a waterproof induction mat to dry after being washed.

In other embodiments, the coffee grounds stirring device 100 may be charged and/or powered directly from other power sources. For example, in one embodiment, the device may draw power from a thermoelectric material, which converts a temperature gradient directly into electricity. Such a temperature gradient may be obtained from the hot water used to brew the coffee, or from the heat of the brewed coffee itself. In other embodiments, the device 100 may be powered by a direct connection to a coffee maker. Integration with a coffee maker will be discussed in greater detail with respect to FIG. 9b, below.

FIG. 5 shows a top view of a stirring assembly 102, with the top layer (including the buttons 114 and the funnel 116) made transparent to show the interior of the housing 110, and the underside of the funnel 116. As shown, the housing 110 contains a control circuit 500, a plurality of electrical contacts 502, and a battery 504; also shown is the motor 106 and the sensor 112. These elements are in electrical communication with each other. The control circuit 500 drives the motor 106 in response to a state change of a sensor 112, and in a way defined by the buttons 114, according to various embodiments.

In some embodiments, the control circuit 500 may drive the motor 106 to rotate the at least one blade 108 at a particular speed. As a particular example, the control circuit 500 may drive the motor 106 to rotate the blades 108 at a speed between 60 and 120 rotations per minute. In some embodiments, the rotation speed may be pre-determined. In other embodiments, the rotation speed may be determined at the time of use, and may be based upon factors including resistance experienced by the blades, type of beverage being made, user preference, a concentration of dissolved solids present in the brewed liquid, and the like. In still other embodiments, the control circuit 500 may drive the motor 106 to rotate the blades 108 at different speeds depending on the stage of the brewing process. For example, it may rotate slowly at first, to saturate the grounds with liquid, and then increase speed once saturation has occurred.

According to various embodiments, the control circuit 500 may drive the motor 106 to rotate the blades 108 intermittently, rather than rotating constantly throughout the brewing process. The use of intermittent rotation is advantageous, as it preserves battery life, and has been shown to yield results similar to those rendered by constant stirring. In some embodiments, the control circuit 500 may drive the rotation intermittently with a predefined periodicity, while in other embodiments the periodicity may be defined by the user, or by the control circuit 500 in response to one or more inputs from a sensor 112.

As shown in FIG. 5, the control circuit 500 is in electrical communication with the sensor 112. According to various embodiments, the control circuit 500 may start driving the motor 106 to rotate the blades 108 in response to input from a sensor 112. As an option, the control circuit 500 may start driving the motor 106 immediately upon receiving such an input from the sensor 112, or it may start the rotations once a predetermined period of time has elapsed since the initial detection of liquid by the sensor. This may allow the liquid time to saturate the grounds.

In some embodiments, the control circuit 500 may stop driving the motor 106 in response to an input from a sensor 112, such as an absence of liquid at the small opening 120 of the funnel 116. The control circuit 500 may halt the rotation immediately upon receiving such an input, or may start a timer that will halt the rotation, as there may still be liquid in the grounds even though the flow has stopped in the funnel 116. In other embodiments, the control circuit 500 may halt the rotations after a predetermined (or user selected) period of time has elapsed.

The control circuit 500 may also drive the motor 106 to rotate the blades 108 for reasons other than stirring, according to various embodiments. For example, in one embodiment, after stirring has halted and the brew process is complete, the control circuit 500 may drive the blades to "wiggle", rotating back and forth a small amount to push the used coffee grounds off of and away from the blades 108, facilitating clean up and preventing grounds from falling off the blades 108 when the assembly 102 is decoupled from the basket 104. In another embodiment, the control circuit 500 may vibrate the blades 108 rapidly to assist in lowering them into a stirring basket filled with coffee grounds. The vibration may help the blades 108 to burrow into the grounds, making it easier to insert the assembly 102 far enough into the basket 104 that the two may be coupled. The vibration may be driven in response to input from a sensor, such as a pressure sensor or an accelerometer.

Figure 6:
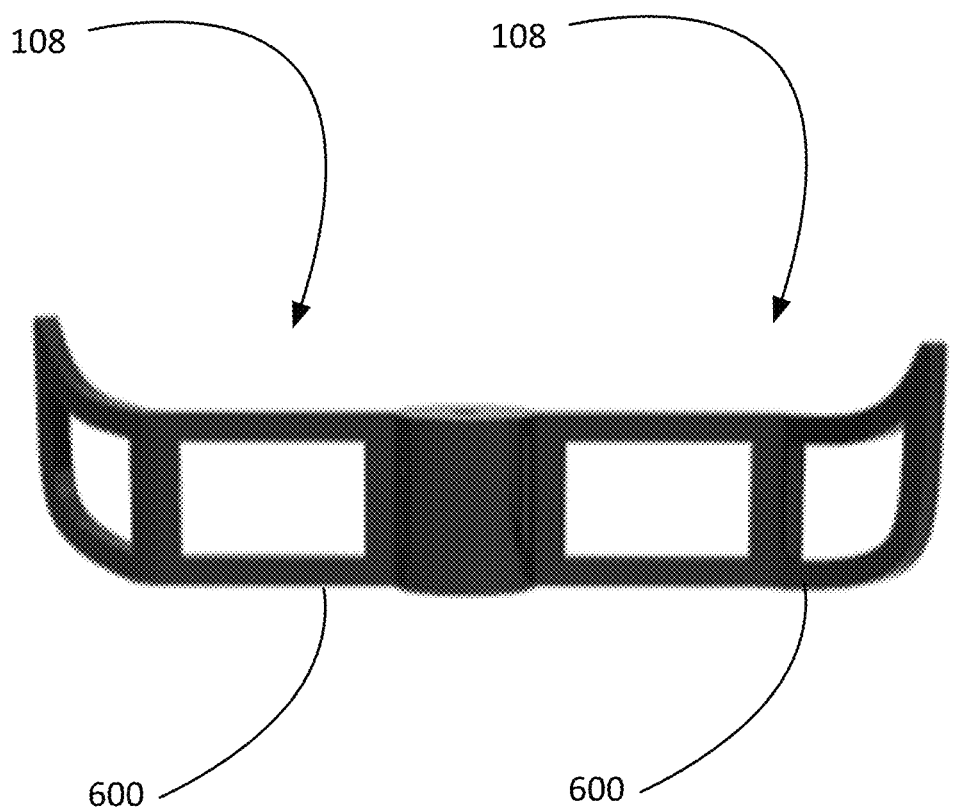
FIG. 6 is a side view of a blade of a coffee grounds stirring device.
Figure 7:
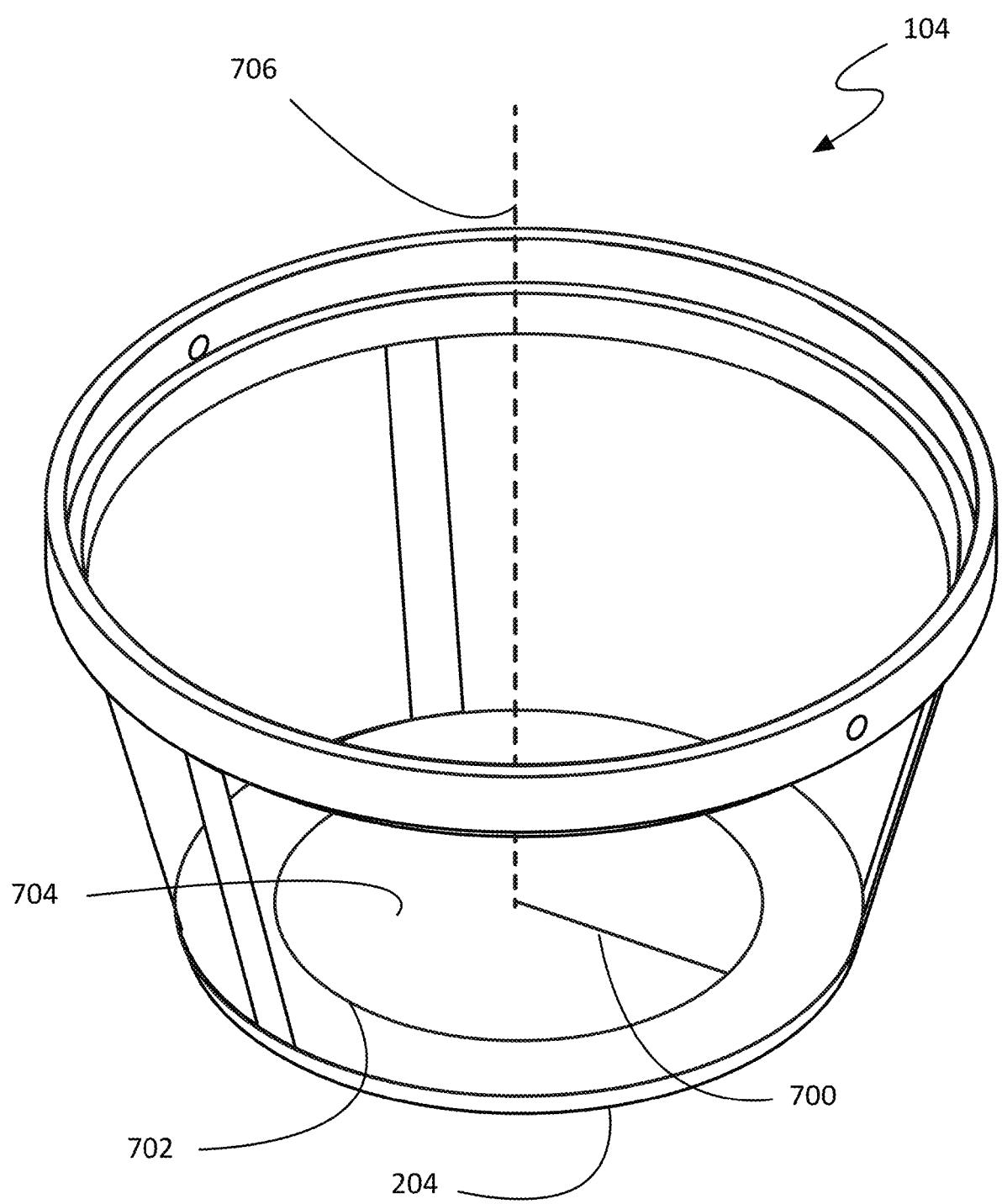
FIG. 7 is a perspective view of a stirring basket of a coffee grounds stirring device.

FIG. 6 shows a side view of blades 108 from a stirring assembly 102, and FIG. 7 shows the environment in which they rotate, specifically, a stirring basket 104. As shown in the non-limiting examples of FIG. 6 as well as FIGS. 1, 2, and 4, a blade 108 comprises a lower edge 600 that is proximate the basket floor 204 when the stirring assembly 102 is coupled to the stirring basket 104. In some embodiments, the lower edge 600 is close enough to the basket floor 204 to agitate the coffee grounds stuck at the very bottom of the stirring basket 104 such that they are exposed to additional water. As an option, the lower edge 600 may be closer than half the average thickness of a coffee bean, to prevent a rogue bean from jamming the blade 108.

In some embodiments, the lower edge 600 may be coextensive with a radius 700 of a circle 702 having a surface area 704 equal to at least a majority of the surface area of the basket floor 204. See, for example, FIG. 7. In other embodiments, only portions of the lower edge 600 of a blade 108 may be proximate the basket floor 204.

As shown, a stirring assembly 102 may comprise two blades 108 opposite each other, according to some embodiments. In other embodiments, a single blade 108 may be used. In still other embodiments, multiple blades 108 may be used. The blades may be homogenous, or one or more may be different. Some blades may extend along the side wall 202 of the basket 104, while other blades may extend into the central area of the basket 104.

According to some embodiments, a motor 106 drives the blades 108 to rotate above the basket floor 204 on a rotational symmetry axis 706 of the basket floor 204. In other embodiments, the blades may rotate about a different axis. For example, in one embodiment, a blade may rotate about an axis which is itself processing along an orbit within the stirring basket 104.

FIG. 8 shows an exploded view of an exemplary use environment for a coffee grounds stirring device 100. According to various embodiments, a coffee grounds stirring device 100 is sized so it may fit within the coffee basket 800 of a conventional coffee maker 802. As a specific example, in one embodiment, the device 100 may have dimensions such that it will fit entirely within the coffee basket 800 of a standard 12-cup-capacity coffee maker. In another embodiment, the device may be sized to fit in a coffee basket 800 having a largest width 806 less than five inches.

The type of filter used to brew coffee is often a matter of personal preference. Some embodiments of a coffee grounds stirring device 100 may be placed inside a paper coffee filter 804, which is then trapped between the inside of the coffee basket 800 and the outside of the stirring basket 104 during the brewing process. As an option, the device 100 may be used with other types of filters, such as reusable filters.

The non-limiting examples of blade-based embodiments of the coffee grounds stirring device 100 shown in FIGS. 1-8, and discussed above, are just a few of the multitude of embodiments of devices, methods and systems for agitating (e.g. mixing, vibrating, stirring, swirling, conveying, etc.) coffee grounds within a coffee brewing environment. These various embodiments operate on the same principle, that of providing the agitated coffee brewing and its accompanying benefits, without drastically deviating from the conventional coffee maker construction, if deviating at all.

Contemplated herein are systems, methods, and devices for the agitation of coffee grounds. As will be discussed below, stirring is only one possibility of agitation. Moving forward, it should be noted that while some of the language has been modified to reflect the more generalized discussion of the devices and methods discussed above, they are mostly referring to the same structures previously disclosed. For example, contemplated herein is a system 900 and device 902 (e.g. coffee stirring device 100, etc.) for coffee grounds agitation, making use of an agitating assembly 904 (e.g. stirring assembly 102, etc.) comprising at least one agitator 908 (e.g. blade 108, etc.) substantially contained within a brewing basket 910 (e.g. stirring basket 104, coffee basket 800, etc.). In fact, all of the previous discussion with respect to the stirring devices and methods is equally valid in the present context. The word 'stirring' has just been replaced with 'agitation'. All of the systems, methods, and devices contemplated herein are based on the same principles.

Figure 9A:
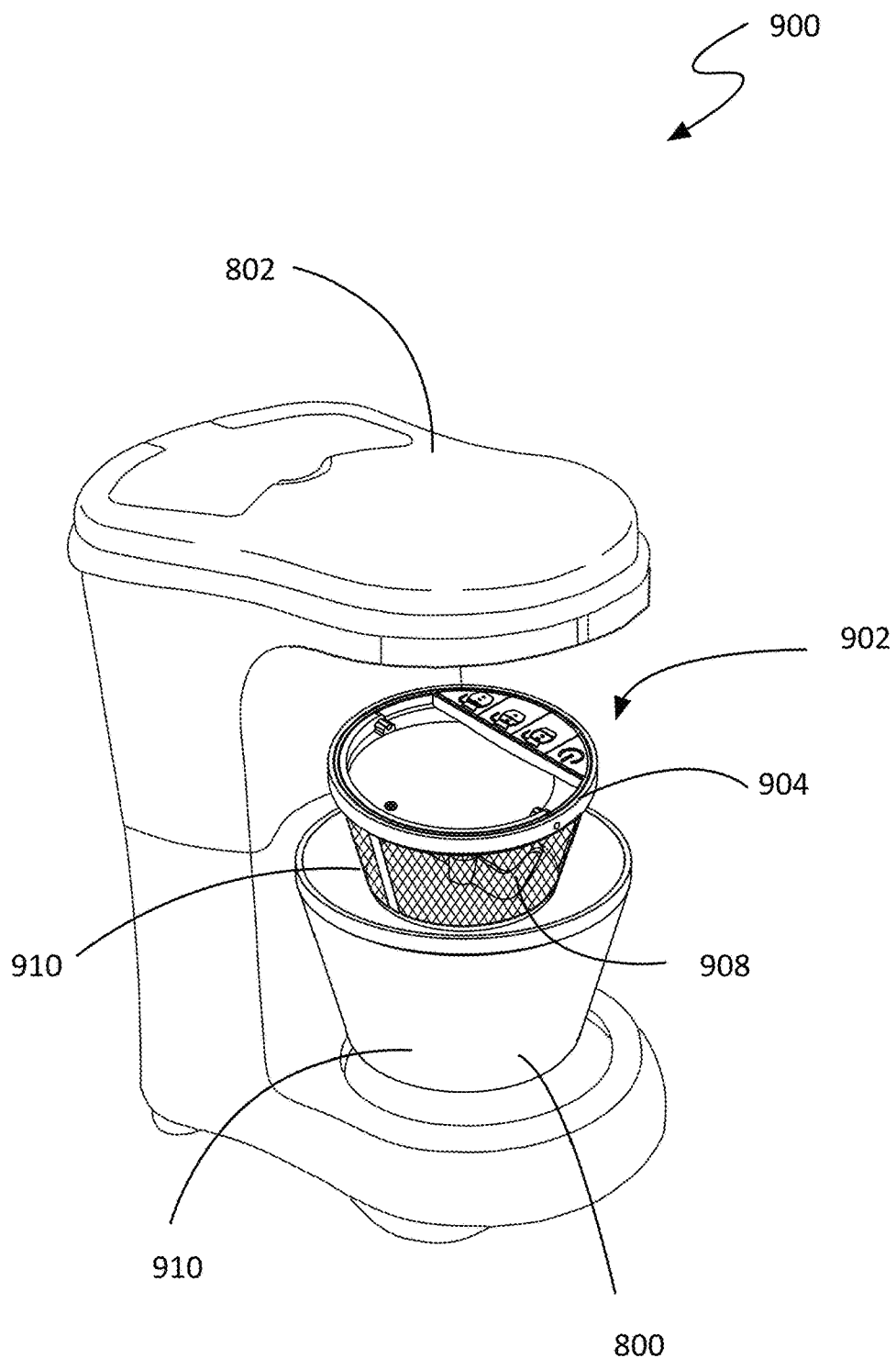
FIG. 9*a* is a perspective exploded view of a coffee grounds agitation system.
Figure 9B:
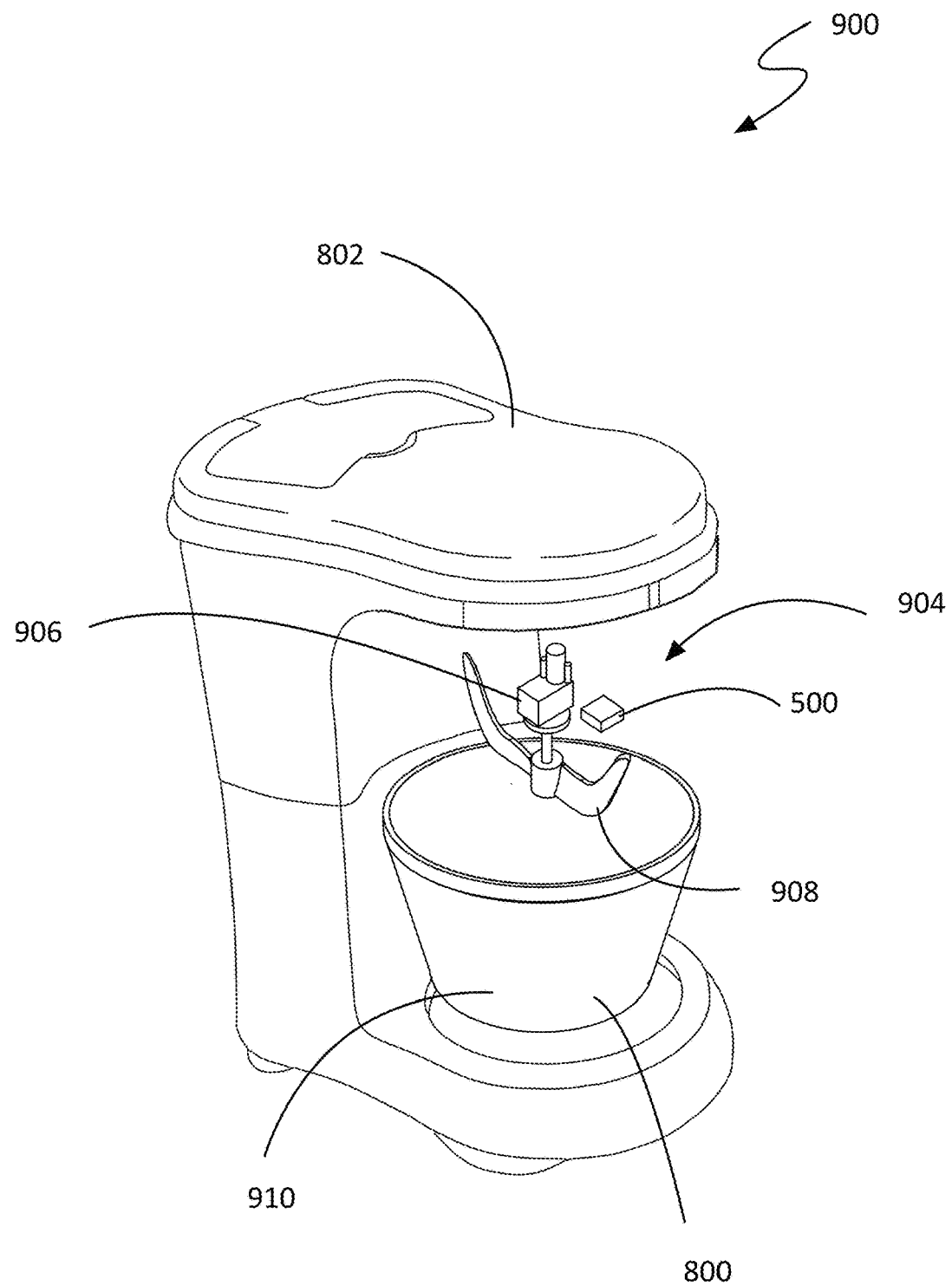
FIG. 9*b* is a perspective exploded view of another embodiment of a coffee grounds agitation system.
Figure 9C:
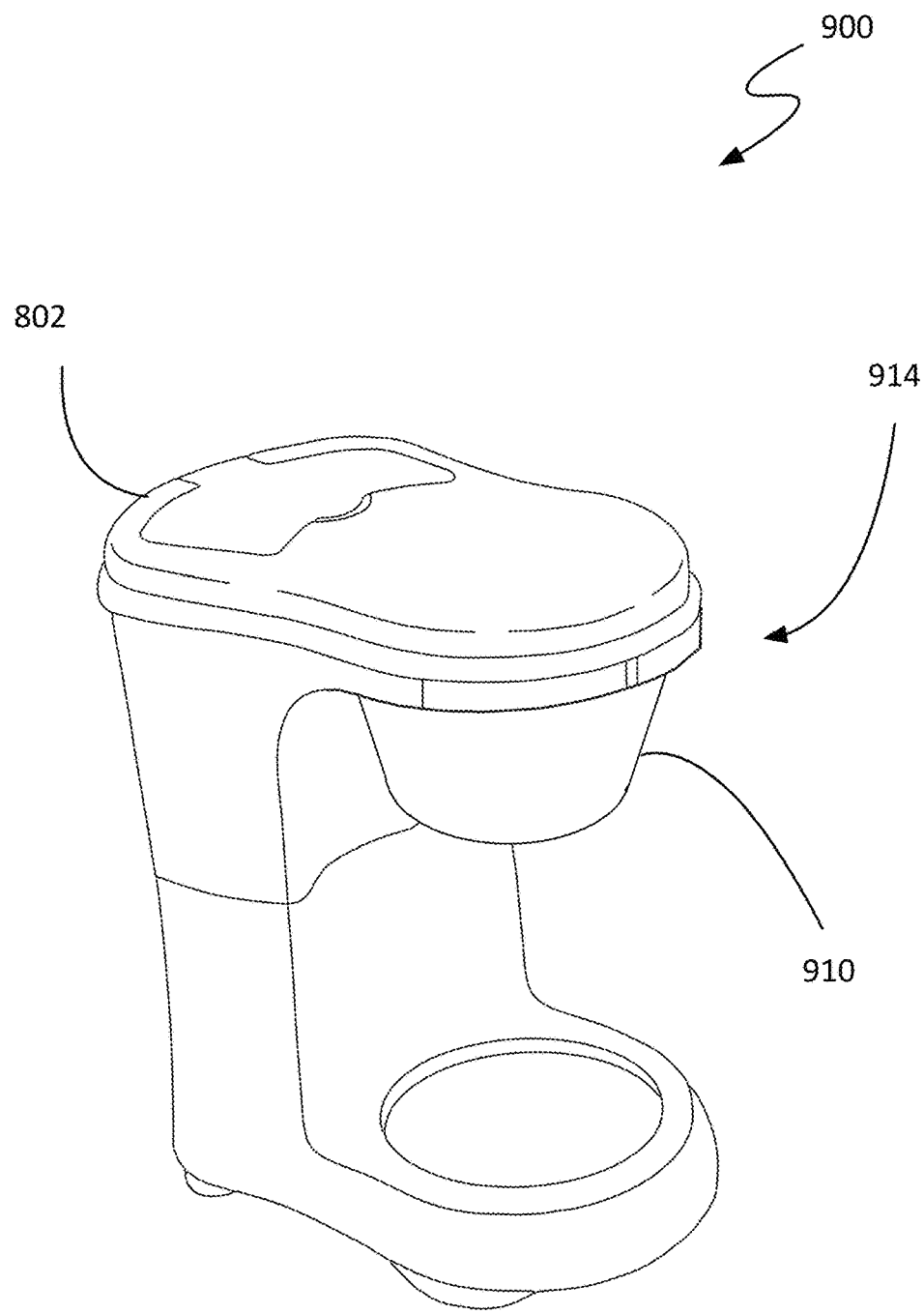
FIG. 9c is a perspective assembled view of a coffee grounds agitation system in a brewing configuration.

FIGS. 9a-c show perspective views of non-limiting examples of two embodiments of a coffee grounds agitation system 900. Specifically, FIG. 9a is a perspective exploded view of a non-limiting example of a coffee grounds agitation system 900 (hereinafter system 900) making use of a coffee grounds agitation device 902 (hereinafter agitation device 902) that is self-contained, like many of the embodiments discussed above. FIG. 9b is a perspective exploded view of a non-limiting example of a system 900 making use of an agitation device 902 that is solely an agitating assembly 904. FIG. 9c is a perspective view of a non-limiting example of either of the two embodiments shown in FIGS. 9a and 9b, assembled, and in a brewing configuration 914.

As shown in FIG. 9a, the coffee grounds stirring device 100 previously discussed is also a coffee grounds agitation device 902, and may be incorporated into a system 900 along with a coffee maker 802. Introducing the new terminology that will be used to discuss the systems, methods, and devices contemplated herein, the stirring basket is also referred to as the first brewing basket 912. In the context of the present description and the claims that follow, a brewing basket 910 is a basket that can contain coffee grounds while allowing water to pass through at least one portion of mesh, such as a mesh wall or a mesh floor. Specific but non-limiting examples of brewing baskets 910 include stirring baskets as well as coffee baskets 800 (i.e. the basket the comes with a coffee maker that is designed to engage or otherwise interface with the coffee maker during traditional use). The first brewing basket 912 is simply the brewing basket 910 that is closest to the coffee grounds, according to some embodiments.

As shown, the agitating assembly 904 is releasably coupled proximate to the basket rim of the first brewing basket 912 (i.e. stirring basket). In the context of the present description and the claims that follow, an agitating (or stirring) assembly is releasably coupled proximate to the rim of a brewing basket 910 when it is within 15% of the rim. Furthermore, as shown, the device 902 is sized to fit inside the coffee basket 800 while the coffee basket 800 is engaged with the coffee maker 802, according to various embodiments. In the context of the present description and the claims that follow, a coffee basket 800 is engaged with a coffee maker 802 when it has been inserted into, or otherwise interfacing with, the maker, as is usually done when operating the maker in the intended and conventional fashion.

FIG. 9b shows a system 900 comprising an agitating assembly 904 that is incorporated into the coffee maker 802. Partially incorporating with a coffee maker (e.g. drawing power from the maker through a coupling, etc.) may be advantageous, as not having to rely on a removable power source such as batteries allows for more robust agitation methods to be used that would otherwise be too power-hungry for practical use with battery power. In some embodiments, a device 902 may be incorporated into a conventional maker 802 after manufacture, while in other embodiments the incorporation may be made at the time of manufacture of the coffee maker 802.

As shown, the system 900 comprises a driver 906, which impels the agitator(s) 908 (e.g. blades 108, etc.), or the member responsible for the agitation, to move within the brewing basket 910. In some embodiments, the driver 906 may be a motor 106. Other examples of driver 906/agitator 908 pairings include, but are not limited to, an air pump or steam source and a nozzle (e.g. to puff up the grounds with air or steam, etc.), a linear actuator and a piston having a mesh floor (e.g. moving the grounds through the mesh as water passes in the other direction, etc.), a transducer and a vibrating probe, and the like. As shown, the system 900 also comprises a control circuit 500.

FIG. 9c shows a system 900 where the agitating assembly 904 is in a brewing configuration 914. According to various embodiments, an agitating assembly 904 is in a brewing configuration 914 when the one or more agitators 908 are substantially contained within the brewing basket 910 while they are also operatively engaged with the driver 906.

In the context of the present description and the claims that follow, the agitators 908 are substantially contained within the brewing basket 910 when no more than 15% of the agitators 908 structure is outside the boundaries of the brewing basket 910. Furthermore, the agitators and the driver are operatively engaged when they are coupled such that the driver can impel the agitators to move or otherwise agitate within the brewing basket. The agitating assembly is able to move into and out of the brewing configuration 914.

Some embodiments of the device 902 include one or more sensors 112, as previously discussed. In some embodiments, the sensors 112 may be used to determine if agitation should be initiated, by detecting if water is being introduced to the coffee grounds or the basket that holds them. In other embodiments, additional sensors may be used for other purposes. For example, in one embodiment, the device 902 may include a sensor 112 that is near the bottom of the device 902, and said sensor 112 may monitor the liquid leaving the device 902. As a specific example, in some embodiments, the sensor 112 may be a refractometer, which may be used to determine the total dissolved solids in the brewed coffee leaving the device 902. Total dissolved solids can be a good indicator of the quality of the coffee, and may inform on attributes such as mouth feel.

In some embodiments, the device 902 or system 900 may comprise network interface devices to permit the control circuit, and any other control systems, to communicate with other devices over a network, as is known in the art. As a specific example, in one embodiment, a device 902 may provide data to a smart phone, including but not limited to brew variables of recent brews (e.g. bloom time, temperature, water to coffee ratio, etc.) and ongoing brews, agitation RPM/speed/routine, historical records, total dissolved solids data, freshness times (indicating how old the brew is, etc.), maintenance reminders (e.g. when to clean to ensure sensors aren't compromised by calcium buildup, etc.), and the like. In some embodiments, the smart phone may be used to modify parameters of the operation of the device or system, such as temperatures (e.g. water temperature, brew temperature, carafe temperature, etc.), agitation routine, water to coffee ratio, and the like.

Figure 10A:
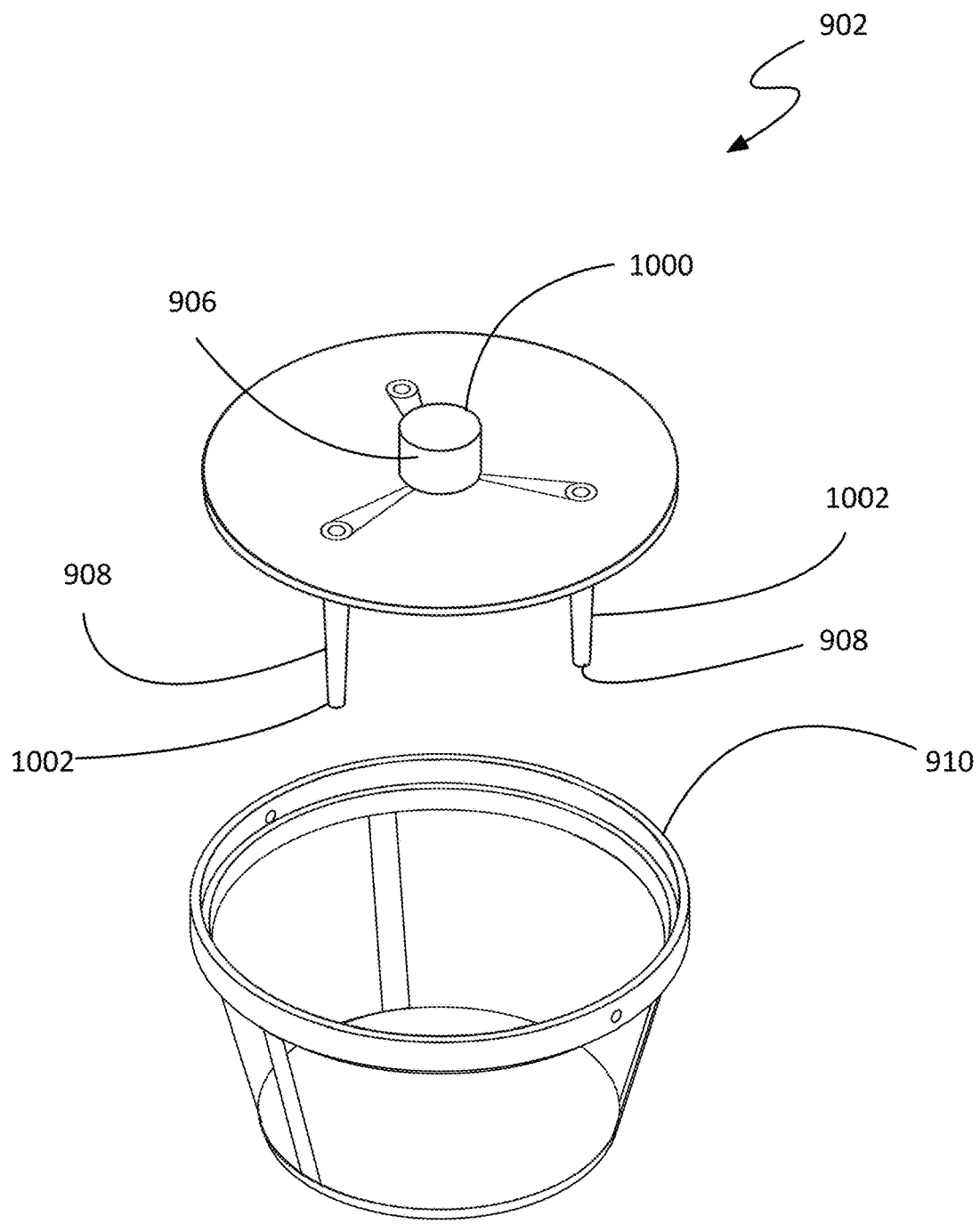
FIGS. 10a and 10b are perspective exploded and assembled views of a coffee grounds agitation device using vibrational agitation.
Figure 10B:
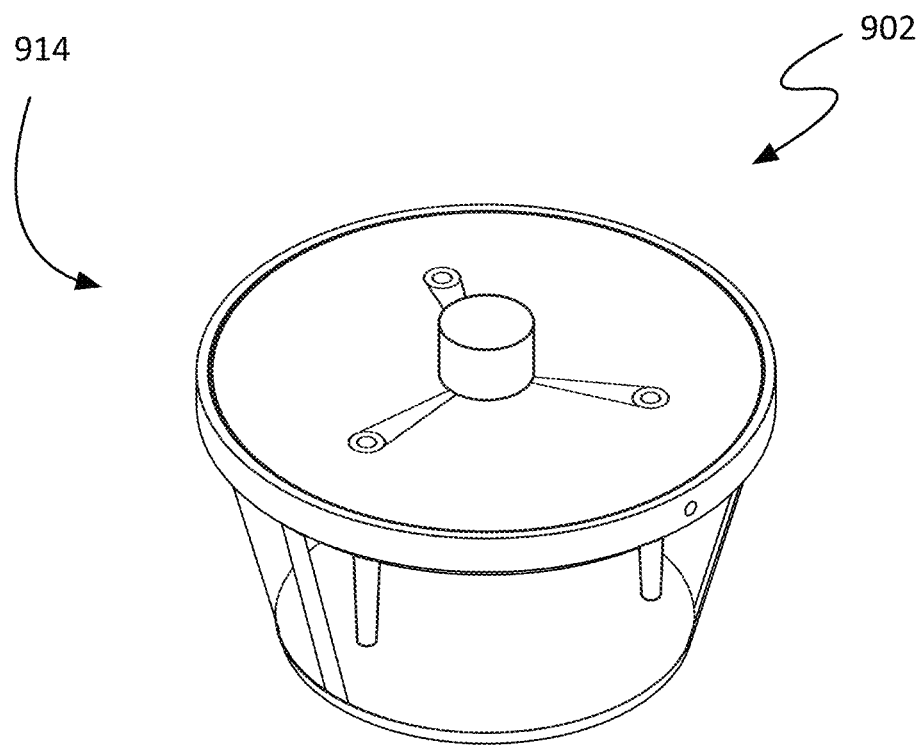
Figure 10C:
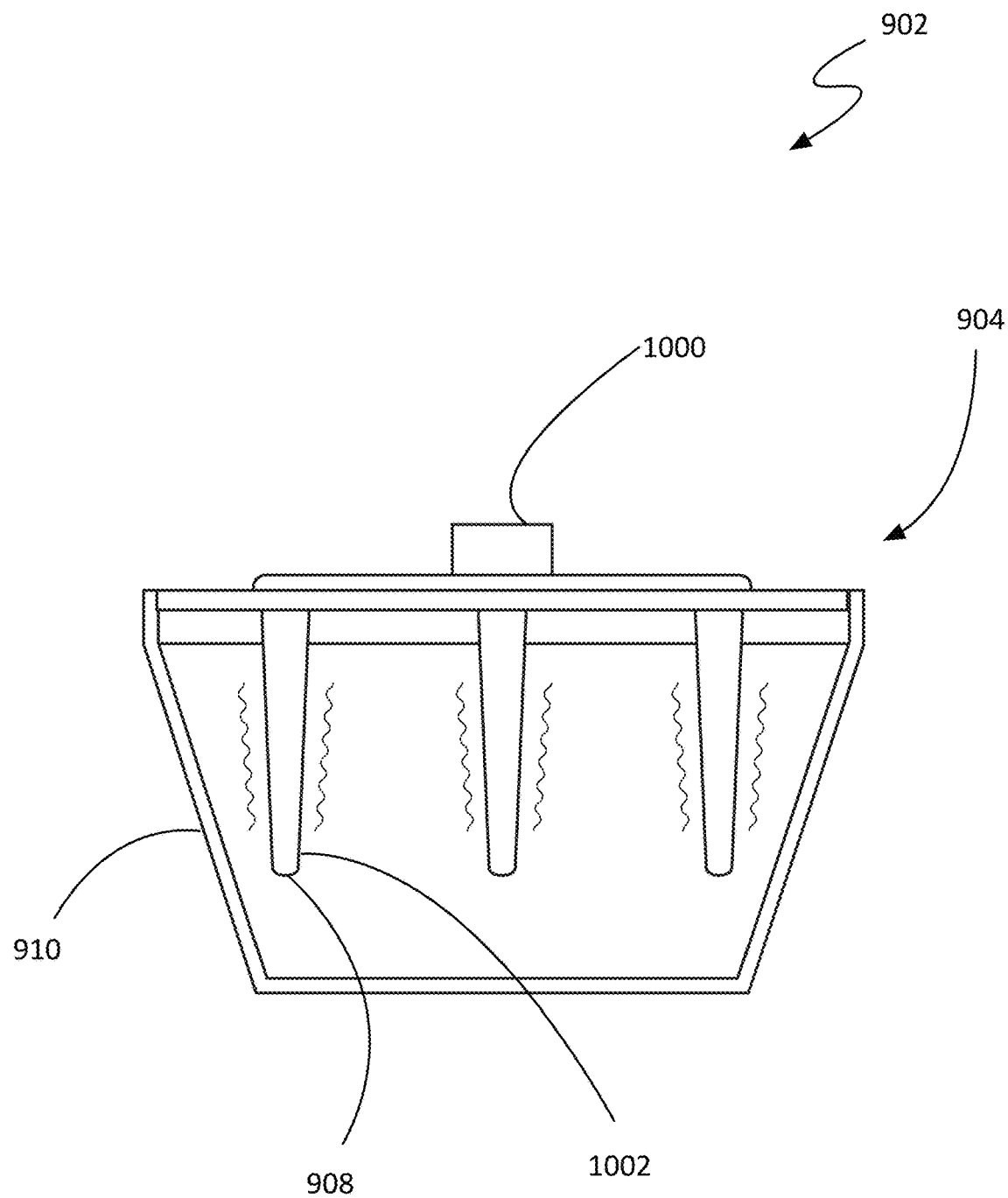
FIG. 10c is a side view of the coffee grounds agitation device of FIGS. 10a and 10b.

FIGS. 10a, 10b, and 10c show various views of a non-limiting example of an agitation device 902 employing a vibrational type of agitation. Specifically, FIG. 10a is a perspective exploded view of the device 902, FIG. 10b is an assembled view of the device 902, and FIG. 10c is a side view of the device 902, with a portion of the brewing basket 912 removed to display the interior According to some embodiments, the device 902 and systems 900 may employ agitating assemblies 904 having one or more agitators 908 that vibrate. In some embodiments, the agitators may be probes 1002 that extend into the brewing basket 912 and into the coffee grounds. As an option, in some embodiments, the probes 1002 may vibrate at ultrasonic frequencies. As shown, in some embodiments, the probes 1002 may be driven by a vibrational motor 1000 or transducer or other source of vibrations, as is known in the art.

The use of vibrating agitators may provide a number of advantages. With no drastic movements, these agitators may be easily sealed for easy cleaning and longer lifespan, when compared to some of the spinning or rotating agitators that are much harder to seal against the water and particulates inherent to coffee brewing. Another advantage is that vibrating agitators may help prevent channeling during the brewing process. Channeling is when the water passing through the grounds forms a channel through the grounds, speeding up the transit time and reducing the portion of coffee grounds being exposed to the water, reducing the efficacy and efficiency of the brew.

In embodiments where the device 902 is not incorporated into the coffee maker, noise may be an issue, as the device 902 may rattle against the coffee basket 800 of the coffee maker. In some embodiments, the brewing basket 910 that is exposed to the structure of the coffee maker may have one or more buffers or bumpers to dampen the transmission of vibrations to the coffee maker, reducing the noise. These bumpers may be composed of silicone, or other elastomeric materials known in the art to be resistant to the temperatures associated with coffee brewing. Other embodiments may make use of gaskets and other structures known in the art for shock absorption.

In some embodiments, the device 902 may comprise a single probe 1002, while in other embodiments the device 902 may comprise multiple probes 1002. In still other embodiments, the vibrations may be transmitted through a different structure, such as a brewing basket 910 that has been properly isolated from the rest of the system 900. In some embodiments, all probes 1002 may be driven or impelled by a single driver 906 (i.e. motor 1000), while in other embodiments, each probe 1002 may have its own driver 906.

As previously discussed, the quality of the extraction, and the quality of the resulting coffee, can strongly depend on the nature of how the water is interacting with the grounds. Extraction can be increased by direct agitation, such as stirring or vibrating, and may also be increased by the water itself. Increased water turbulence can increase extraction during brewing. The manner in which the water is introduced to the grounds, and the uniformity of its distribution may also have an impact on the resulting drink.

Baristas have developed a number of different methods for ensuring a good even distribution of water and a controlled, tuned interaction between the grounds and the water. Some of these methods may be replicated, or even improved up, by various embodiments the device 902 and system 900.

Figure 11A:
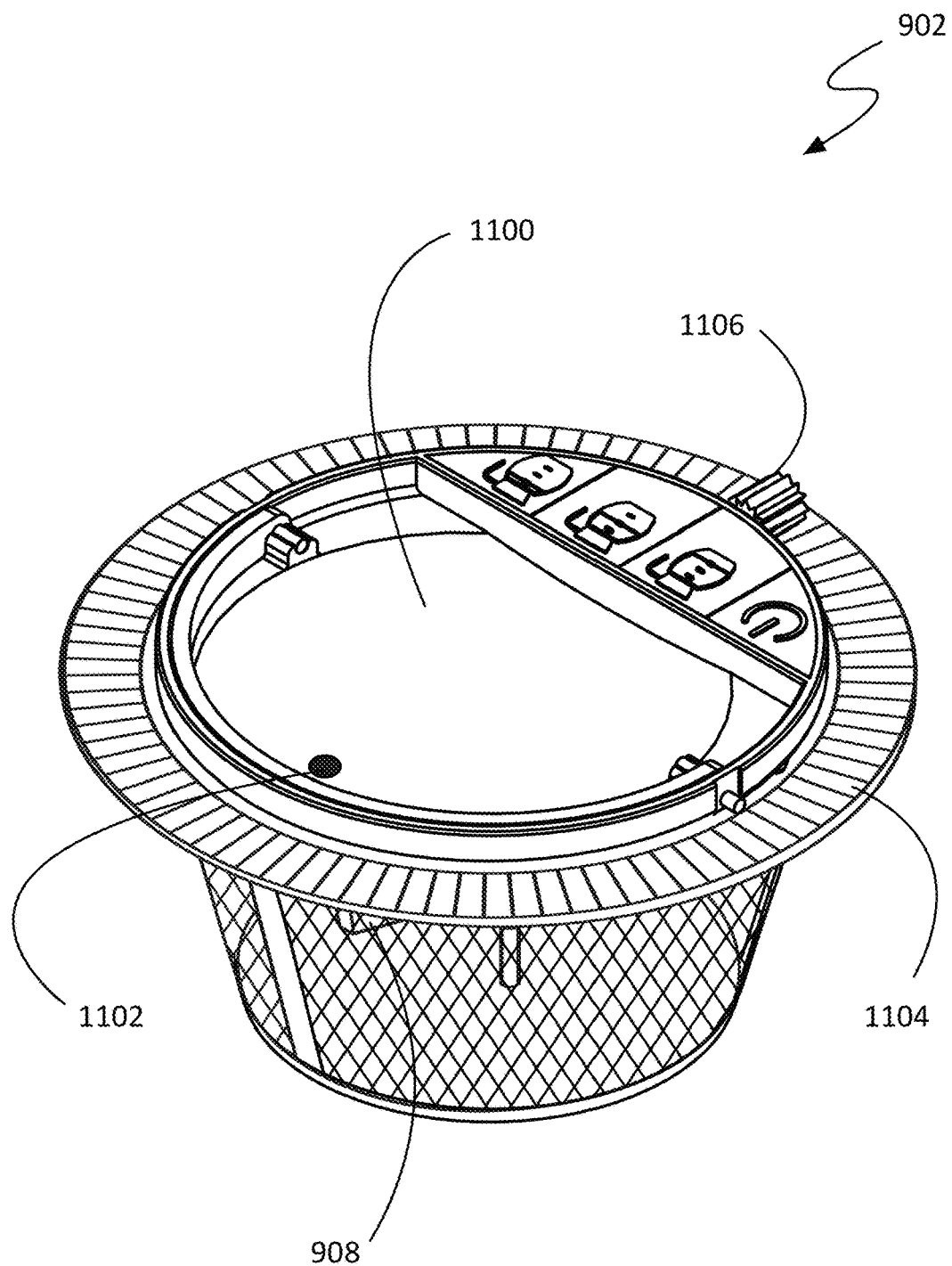
FIGS. 11a and 11b are perspective and side views of a coffee ground agitation device with rotating water deliver.
Figure 11B:
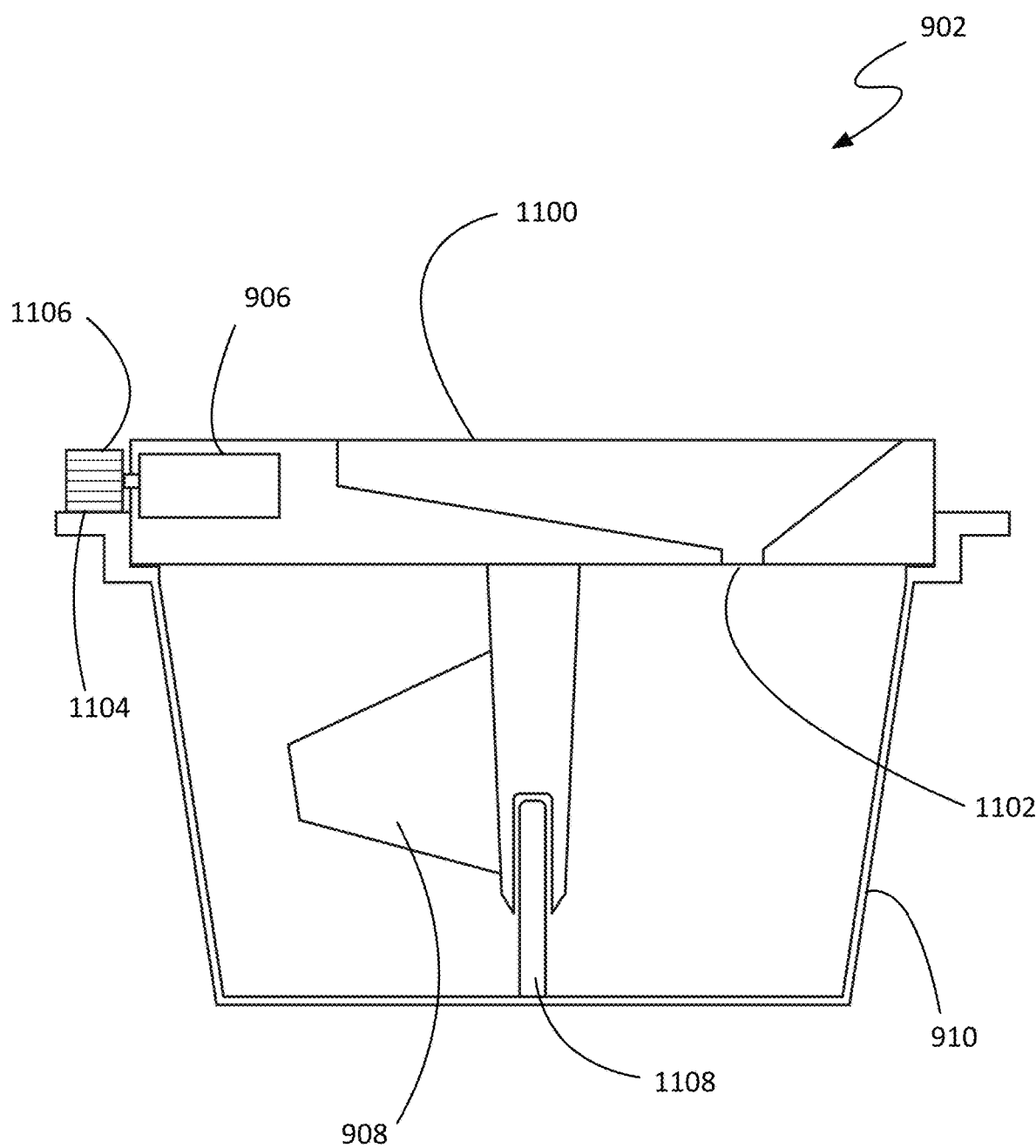

FIGS. 11a and 11b show perspective and side views of a non-limiting example of a device 902 having a rotating water source. Similar to the device shown in FIGS. 1-4, above, this device comprises a water inlet 1100 which receives water from a coffee maker 802 (e.g. the large opening 118), and a water outlet 1102 that is positioned to release water introduced through the water inlet into brewing basket and onto the coffee grounds (e.g. the small opening 120). In some embodiments, the water outlet 1102 receives water directly from the coffee maker, being in fluid communication with the water maker's water supply.

The assembly interfaces with the basket through a rack 1104 and pinion 1106, allowing it to rotate with respect to the basket as the driver 906 (e.g. a motor) turns the pinion 1106. The assembly has an agitator 908 that is coupled to the other elements and structure of the assembly such that as the assembly rotates with respect to the basket, the agitator turns as well. As the assembly turns, the water outlet 1102 orbits above the coffee grounds, distributing water similar to a barista's pour over. As an option, the agitator may rotate on an axle that extends from the floor of the brewing basket, for added stability.

Figure 12A:
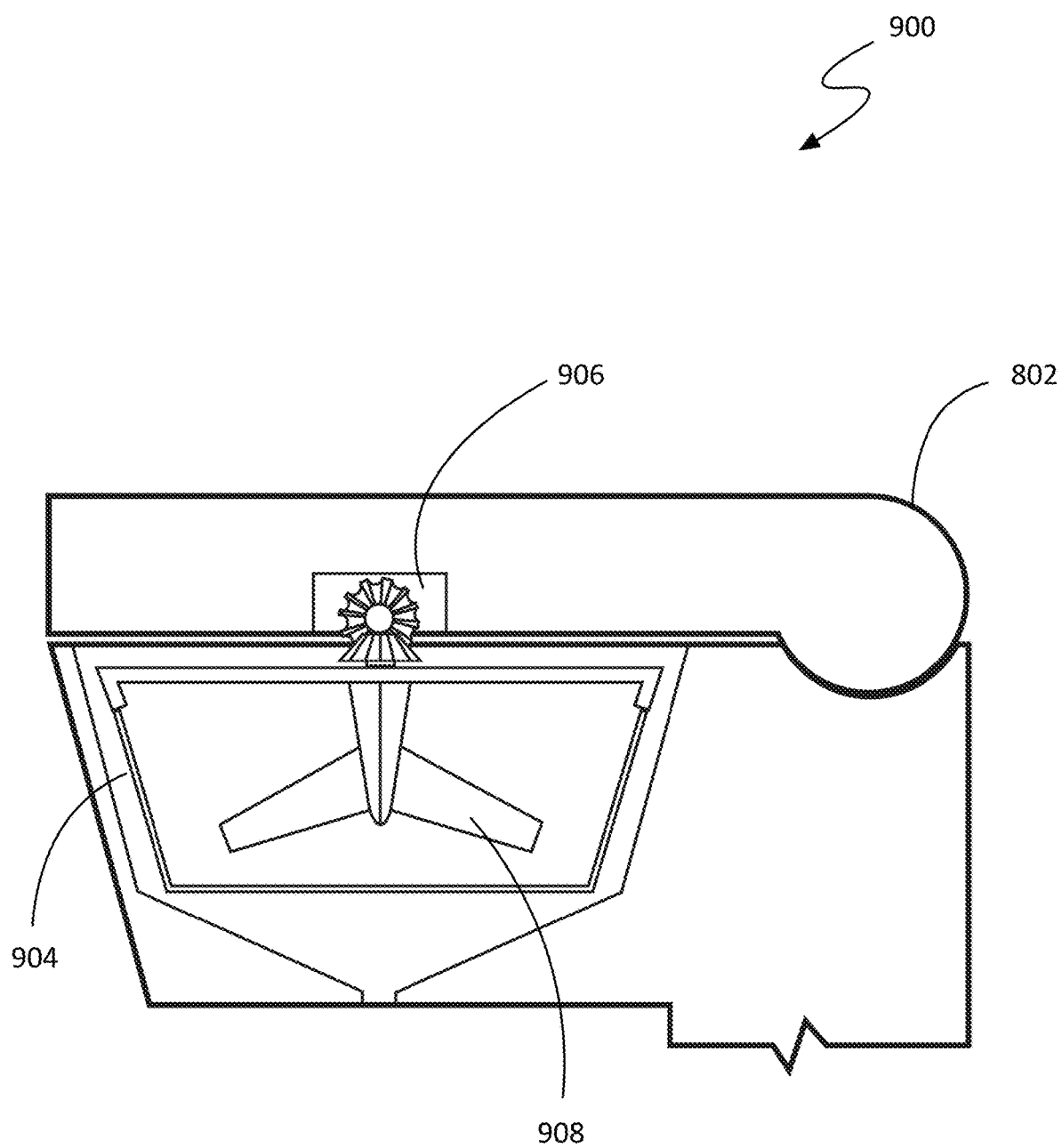
FIGS. 12a and 12b are side views of agitation assemblies integrated into coffee grounds agitation systems.
Figure 12B:
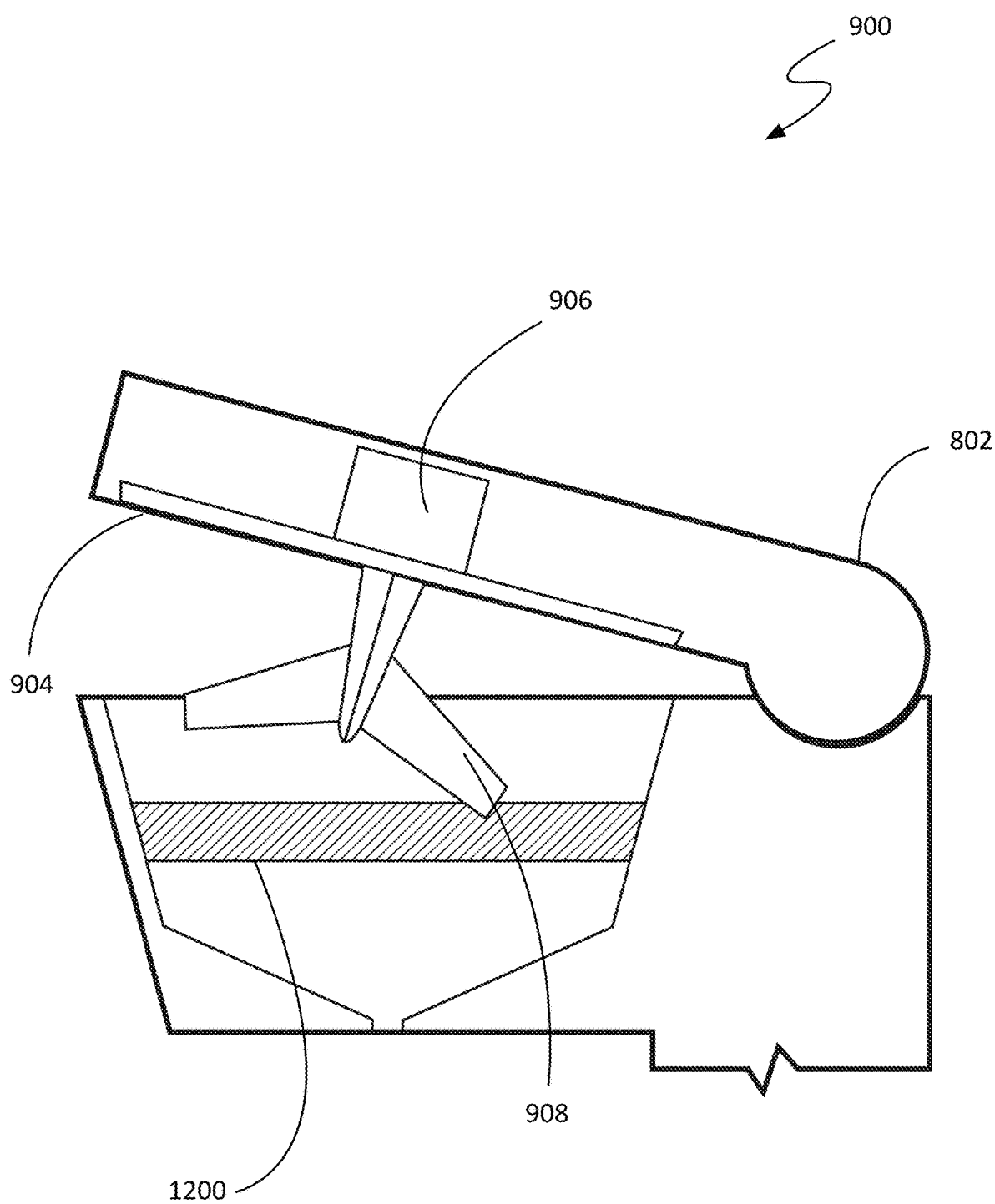

FIGS. 12a and 12b are side views of non-limiting examples of an agitating assembly 904 incorporated into a system 900. In some embodiments where the device 902 is incorporated into the coffee maker 802, the coupling is simply shared power. In other embodiments, the actual structure of the maker may be employed. Some coffee makers interface with a coffee basket in a manner that makes it easy to move the assembly into a brewing configuration. In other embodiments, the coffee basket is not easily slid into the agitators.

For example, as shown in FIG. 12a, the maker may hinge to receive the coffee basket. According to various embodiments, the agitator(s) may be releasably coupled to the driver 906 which may be affixed to and powered by the coffee maker, and also movably coupled to a brewing basket. This is advantageous, as separating the driver from the rest of the assembly facilitates cleaning, and makes it easier to create a dishwasher-safe embodiment.

As shown in FIG. 12b, some embodiments make include a heating element 1200 to modify the temperature of the brewing basket 910, and compensate for heat lost due to the agitation. In some embodiments, the heating element 1200 may encircle the brewing basket, providing uniform thermal contact.

Figure 13:
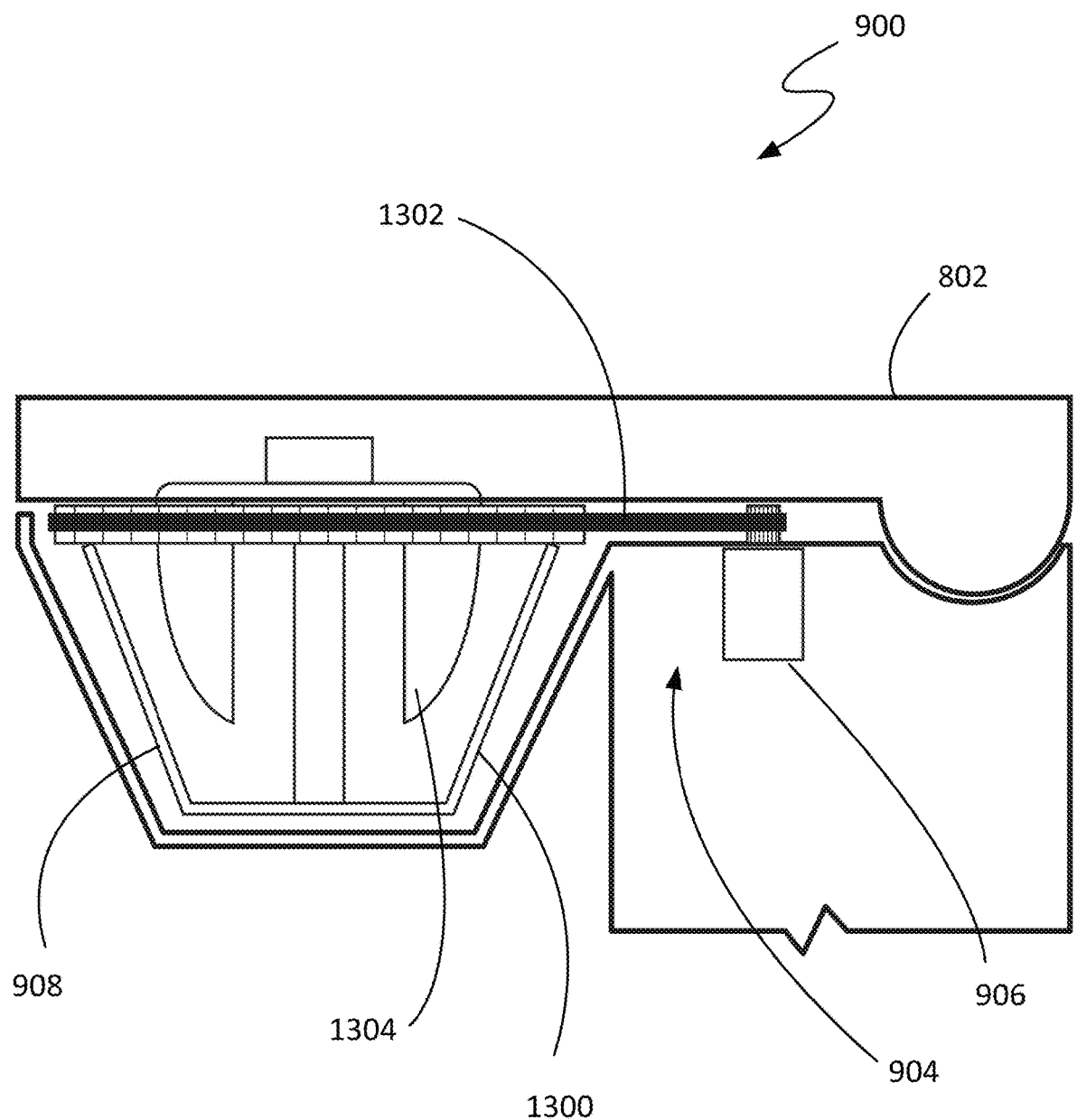
FIG. 13 is a side view of a coffee grounds agitation system with rotating basket.

FIG. 13 is a side view of a non-limiting example of an agitating assembly 904 that is incorporated into a coffee maker, and which uses a brewing basket as an agitator 908. Here, the agitator will be referred to as an agitating basket 1300, though it is very similar to the coffee basket and brewing baskets previously discussed.

As shown, the agitating basket is operatively coupled to the driver 906, in this non-limiting example a motor, through a belt 1302. Other embodiments may engage the driver with the agitating basket using any other means known in the art. In operation, the agitating basket 1300, holding the coffee grounds, rotates, with the coffee grounds being agitated by the presence of a stationary blade 1304.

Other embodiments employing an agitating basket 1300 include embodiments that replicate the methods of a barista using an off-center axis of rotation, resulting in a swirling motion that keeps the grounds agitated while exposed to the hot water. Still other embodiments may employ rotation on an axis closer to horizontal than vertical, resembling a rolling drum having mesh walls and through which the hot water pours.

As a specific use case, a user would add coffee grounds to a brewing basket that comprises at least one mesh wall. They would then move an agitating assembly having at least one agitator into the brewing configuration by inserting the agitator(s) into the coffee grounds until they are substantially, or even entirely, contained within the brewing basket while also being operatively coupled to the driver of the agitating assembly, which may be a motor, for example. The user then couples the assembly to the brewing basket, and places the device 900 into the coffee basket of a coffee maker. The device is advantageously sized so it can fit inside the coffee basket, and still allow the coffee basket to be inserted or otherwise engaged with the coffee maker, as intended. Finally, the brewing process is begun. When the coffee maker introduces hot water to the device, a sensor detects it and sends a signal to the control circuit, which then activates the agitator. The agitation of the coffee grounds while the hot water is passing through results in an end product having improved quality and value.

Where the above examples, embodiments and implementations reference examples, it should be understood by those of ordinary skill in the art that other coffee grounds stirring devices and examples could be intermixed or substituted with those provided. In places where the description above refers to particular embodiments of coffee grounds stirring devices and customization methods, it should be readily apparent that a number of modifications may be made without departing from the spirit thereof and that these embodiments and implementations may be applied to other coffee related technologies as well. Accordingly, the disclosed subject matter is intended to embrace all such alterations, modifications and variations that fall within the spirit and scope of the disclosure and the knowledge of one of ordinary skill in the art.

What is claimed is:

1. A coffee grounds agitation device, comprising:
   an agitating assembly extending into at least one brewing basket having a mesh, the agitating assembly comprising:
   a driver;
   at least one agitator operatively coupled to the driver such that the driver impels the at least one agitator to move within the at least one brewing basket; and
   a control circuit in electrical communication with the driver and configured to impel the at least one agitator with the driver;
   wherein the agitating assembly is movable into, and out of, a brewing configuration comprising the at least one agitator being substantially contained within the at least one brewing basket while also operatively engaged with the driver;
   wherein the at least one brewing basket comprises a first brewing basket, and wherein the agitating assembly is releasably coupled to the first brewing basket proximate a basket rim of the first brewing basket; and
   wherein the at least one brewing basket further comprises a coffee basket of a coffee maker, and wherein the coffee grounds agitation device is sized to fit inside the coffee basket while the coffee basket is engaged with the coffee maker.

2. The device of claim 1, wherein each of the at least one agitator is a blade, the driver is a motor, and wherein the motor impels the at least one blade to rotate within the at least one brewing basket.

3. The device of claim 1, wherein each of the at least one agitator is a probe, the driver is a motor, and wherein the motor impels the at least one probe to vibrate within the at least one brewing basket.

4. The device of claim 1, the agitating assembly further comprising a water inlet in fluid communication with a water outlet, the water outlet positioned to release water introduced through the water inlet into the at least one brewing basket while the agitating assembly is in the brewing configuration.

5. The device of claim 4, wherein the driver impels the at least one agitator to rotate within the at least one brewing basket, and wherein the water outlet is coupled to the at least one agitator such that the water outlet and the at least one agitator rotate together with respect to the at least one brewing basket while the at least one agitator is impelled to rotate by the driver.

6. The device of claim 1, further comprising at least one sensor in electrical communication with the control circuit.

7. The device of claim 6, wherein the at least one sensor comprises one of a conduction sensor, a temperature sensor, and a mechanical switch and is configured to detect a liquid being introduced to the at least one brewing basket by sensing a change in one of conduction, temperature, and force, and wherein the control circuit is configured to impel the at least one agitator with the driver in response to one of the at least one sensor detecting the introduction of liquid to the at least one brewing basket.

8. The device of claim 6, wherein the at least one sensor comprises a refractometer positioned with respect to one of the at least one brewing basket to measure a total dissolved solids of a liquid leaving the at least one brewing basket.

9. A method for agitating coffee grounds, comprising:
adding the coffee grounds to a first brewing basket comprising a mesh;
moving an agitating assembly comprising at least one agitator into a brewing configuration by inserting the at least one agitator into the coffee grounds until the at least one agitator is substantially contained within the first brewing basket while also being operatively coupled to a driver of the agitating assembly, the agitating assembly further comprising a control circuit in electrical communication with the driver and configured to impel the at least one agitator with the driver to move within the first brewing basket;
placing a coffee grounds agitation device comprising the agitating assembly and the first brewing basket and containing the coffee grounds into a coffee basket of a coffee maker;
placing the coffee basket containing the coffee grounds agitation device into the coffee maker; and
agitating the coffee grounds with the at least one agitator by activating the driver with the control circuit while the agitating assembly and first brewing basket are inside the coffee maker and while water received from the coffee maker is introduced to the coffee grounds within the first brewing basket;
wherein the coffee grounds agitation device is sized to fit inside the coffee basket while the coffee basket is in use by the coffee maker.

10. The method of claim 9, wherein each of the at least one agitator is a blade, the driver is a motor, and wherein agitating the coffee grounds comprises activating the motor to drive the at least one blade to rotate within the at least one brewing basket.

11. The method of claim 9, wherein the coffee basket has a largest width less than five inches.

12. The method of claim 9, wherein the control circuit is in electrical communication with a sensor comprising one of a conduction sensor, a temperature sensor, and a mechanical switch, the sensor configured to detect liquid being introduced to the first brewing basket by sensing a change in one of conduction, temperature, and force, and wherein the driver is activated by the control circuit in response to the sensor detecting the introduction of water to the first brewing basket by the coffee maker.

13. A coffee grounds agitation device, comprising:
an agitating assembly extending into at least one brewing basket having a mesh, the agitating assembly comprising:
a driver;
at least one agitator operatively coupled to the driver such that the driver impels the at least one agitator to move within the at least one brewing basket;
a control circuit in electrical communication with the driver and configured to impel the at least one agitator with the driver; and
at least one sensor in electrical communication with the control circuit;
wherein the agitating assembly is movable into, and out of, a brewing configuration comprising the at least one agitator being substantially contained within the at least one brewing basket while also operatively engaged with the driver; and
wherein the at least one sensor comprises one of a conduction sensor, a temperature sensor, and a mechanical switch and is configured to detect a liquid being introduced to the at least one brewing basket by sensing a change in one of conduction, temperature, and force, and wherein the control circuit is configured to impel the at least one agitator with the driver in response to one of the at least one sensor detecting the introduction of liquid to the at least one brewing basket.

14. The device of claim 13, wherein each of the at least one agitator is a probe, the driver is a motor, and wherein the motor impels the at least one probe to vibrate within the at least one brewing basket.

15. The device of claim 13, wherein the at least one brewing basket comprises a first brewing basket, and wherein the agitating assembly is releasably coupled to the first brewing basket proximate a basket rim of the first brewing basket.

16. The device of claim 13, wherein the at least one agitator is releasably coupled to the driver and movably coupled to one of the at least one brewing basket.

17. The device of claim 13, wherein the at least one brewing basket further comprises a coffee basket of a coffee maker, and wherein the coffee grounds agitation device is sized to fit inside the coffee basket when the coffee basket is engaged with the coffee maker.

18. The device of claim 13, wherein the at least one agitator is an agitating basket, the driver is a motor, and wherein the motor impels the agitating basket to rotate within the at least one brewing basket.

19. The device of claim 13, the agitating assembly further comprising a water inlet in fluid communication with a water outlet, the water outlet positioned to release water introduced through the water inlet into the at least one brewing basket while the agitating assembly is in the brewing configuration.

20. The device of claim 19, wherein the driver impels the at least one agitator to rotate within the at least one brewing basket, and wherein the water outlet is coupled to the at least one agitator such that the water outlet and the at least one agitator rotate together with respect to the at least one brewing basket while the at least one agitator is impelled to rotate by the driver.

21. The device of claim 13, further comprising a coffee maker associated with the agitating assembly.

22. The device of claim 21, wherein the control circuit is in electrical communication with the coffee maker, and powered by the coffee maker.

23. The device of claim 21, the agitating assembly further comprising:
  a water outlet in fluid communication with the coffee maker, the water outlet positioned to release water received from the coffee maker into the at least one brewing basket while the agitating assembly is in the brewing configuration;
  wherein the driver impels the at least one agitator to rotate within the at least one brewing basket; and
  wherein the water outlet is coupled to the at least one agitator such that the water outlet and the at least one agitator rotate together with respect to the at least one brewing basket while the at least one agitator is impelled to rotate by the driver.

* * * * *